United States Patent
Keller et al.

(10) Patent No.: US 11,487,460 B2
(45) Date of Patent: Nov. 1, 2022

(54) DEFERRED RECLAMATION OF INVALIDATED ENTRIES ASSOCIATED WITH REPLICATION IN A LOG-STRUCTURED ARRAY

(71) Applicant: EMC IP Holding Company LLC, Hopkinton, MA (US)

(72) Inventors: Itay Keller, Tel Aviv (IL); Dan Aharoni, Brookline, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 113 days.

(21) Appl. No.: 17/123,525

(22) Filed: Dec. 16, 2020

(65) Prior Publication Data

US 2022/0187991 A1    Jun. 16, 2022

(51) Int. Cl.
*G06F 3/06* (2006.01)

(52) U.S. Cl.
CPC ............ *G06F 3/065* (2013.01); *G06F 3/0619* (2013.01); *G06F 3/0652* (2013.01); *G06F 3/0659* (2013.01); *G06F 3/0683* (2013.01)

(58) Field of Classification Search
CPC ...... G06F 3/065; G06F 3/0619; G06F 3/0652; G06F 3/0659; G06F 3/0683
See application file for complete search history.

(56) References Cited

U.S. PATENT DOCUMENTS

| | | | |
|---|---|---|---|
| 5,381,539 A | 1/1995 | Yanai et al. | |
| 5,551,003 A | 8/1996 | Mattson et al. | |
| 5,671,390 A * | 9/1997 | Brady | G11B 27/11 711/136 |

(Continued)

FOREIGN PATENT DOCUMENTS

| | | |
|---|---|---|
| WO | PCT/US2019/024885 | 1/2020 |
| WO | PCT/US2019/024900 | 1/2020 |

(Continued)

OTHER PUBLICATIONS

Hu, Q., Ren, J., Badam, A., Shu, J., & Moscibroda, T. (2017). Log-Structured Non-Volatile Main Memory. USENIX Annual Technical Conference. Hu teaches tombstone identification in log-structured storage. (Year: 2017).*

(Continued)

*Primary Examiner* — Eric Cardwell

(74) *Attorney, Agent, or Firm* — Ryan, Mason & Lewis, LLP

(57) ABSTRACT

In some embodiments, a storage system comprises at least one processor coupled to memory. The processor is configured to obtain a write operation that comprises first data associated with a logical data device and to store the first data in a first entry of a log-structured array (LSA). The at least one processor is configured to invalidate a second entry based at least in part on the storage of the first data in the first entry. The second entry comprises second data associated with the logical data device that was stored in the second entry prior to obtaining the write operation. The at least one processor is configured to determine that a first indication in LSA metadata associated with the LSA indicates that the invalidated second entry comprises data that is awaiting replication and to defer reclamation of the second entry based at least in part on the determination.

20 Claims, 6 Drawing Sheets

(56) References Cited

U.S. PATENT DOCUMENTS

| | | | |
|---|---|---|---|
| 5,764,880 | A | 6/1998 | Gerdt et al. |
| 5,933,840 | A * | 8/1999 | Menon ................. G06F 3/0674 |
| 6,052,799 | A | 4/2000 | Li et al. |
| 6,941,420 | B2 | 9/2005 | Butterworth et al. |
| 8,843,676 | B2 | 9/2014 | Rajamanickam et al. |
| 8,898,376 | B2 * | 11/2014 | Aune ..................... G06F 3/064 |
| | | | 711/103 |
| 9,372,751 | B2 | 6/2016 | McNutt |
| 9,514,014 | B2 | 12/2016 | Webman et al. |
| 9,892,045 | B1 | 2/2018 | Douglis et al. |
| 10,078,598 | B1 | 9/2018 | Wallace et al. |
| 10,331,561 | B1 | 6/2019 | Shilane et al. |
| 10,445,180 | B2 | 10/2019 | Butterworth et al. |
| 2002/0032835 | A1 | 3/2002 | Li et al. |
| 2008/0021853 | A1 | 1/2008 | Modha et al. |
| 2009/0204761 | A1 | 8/2009 | Caprioli et al. |
| 2009/0276593 | A1 | 11/2009 | Jacobson et al. |
| 2013/0305002 | A1 | 11/2013 | Hallak et al. |
| 2014/0244935 | A1 | 8/2014 | Ezra et al. |
| 2016/0103764 | A1 | 4/2016 | Banerjee et al. |
| 2017/0024315 | A1 * | 1/2017 | Leshinsky ........... G06F 12/0238 |
| 2018/0046552 | A1 * | 2/2018 | Madhavarapu ..... G06F 11/2097 |
| 2018/0113640 | A1 | 4/2018 | Fernandez et al. |
| 2018/0267893 | A1 | 9/2018 | Barzik et al. |
| 2018/0300075 | A1 | 10/2018 | Fernandez et al. |
| 2019/0227845 | A1 | 7/2019 | Sridhar et al. |

FOREIGN PATENT DOCUMENTS

| | | | |
|---|---|---|---|
| WO | 2020204880 | A1 | 10/2020 |
| WO | 2020204882 | A1 | 10/2020 |

OTHER PUBLICATIONS

Dell EMC, "Dell EMC VxRack FLEX," Dell EMC Product Overview, 2018, 5 pages.

G. Soundararajan et al., "Dynamic Resource Allocation for Database Servers Running on Virtual Storage," FAST 2009: Proceedings of the 7th conference on File and storage technologies, Feb. 2009, pp. 71-84.

Dell EMC, "EMC ScaleIO Basic Architecture Documentation," Technical White Paper, Mar. 2017, 22 pages.

EMC2, "EMC ScaleIO Design Considerations and Best Practices," Technical White Paper, Jun. 2016, 30 pages.

I. Koltsidas et al., "SoftwAre Log-Structured Array (SALSA)—A Unified Stack for SSDs and SMR Disks," IBM Research Report, Dec. 2, 2015, 13 pages.

S. M. Rumble et al., "Log-Structured Memory for DRAM-Based Storage," Proceedings of the 12th USENIX Conference on File and Storage Technologies, Santa Clara, CA, Feb. 17-20, 2014, 17 pages.

Dell EMC, "Dell EMC VxFlex Family Overview," Technical White Paper, May 2019, 44 pages.

J. Nakano et al., "ReViveI/O: Efficient Handling of I/O in Highly-Available Rollback-Recovery Servers," HPCA, 10.1109/2006.1598129, pp. 200-211.

Wikipedia, "Raft (Computer Science)," https://en.wikipedia.org/wiki/Raft_(computer_science), Feb. 10, 2020, 4 pages.

Wikipedia, "Paxos (Computer Science)," https://en.wikipedia.org/wiki/Paxos_(computer_science), Dec. 6, 2019, 21 pages.

Wikipedia, "State Machine Replication," https://en.wikipedia.org/wiki/State_machine_replication, Dec. 14, 2019, 9 pages.

Dell Technologies, "Dell EMC PowerFlex: Secure Snapshots," Technical White Paper, Jul. 2020, 17 pages.

Dell Technologies, "Dell EMC PowerFlex: Protected Maintenance Mode," Technical White Paper, Jul. 2020, 20 pages.

Dell Technologies, "Dell EMC PowerFlex: Introduction to Replication," Technical White Paper, Jun. 2020, 34 pages.

Dell Technologies, "Dell EMC PowerFlex: Networking Best Practices and Design Considerations," Best Practices, Jun. 2020, 64 pages.

U.S. Appl. No. 16/343,942 filed in the name of Yonatan Shtarkman et al. on Apr. 22, 2019, and entitled "Snapshot-Enabled Storage System Implementing Algorithm for Efficient Reclamation of Snapshot Storage Space."

U.S. Appl. No. 16/343,949 filed in the name of Asaf Porath et al. on Apr. 22, 2019, and entitled "Snapshot-Enabled Storage System Implementing Algorithm for Efficient Reading of Data from Stored Snapshots."

U.S. Appl. No. 16/807,709 filed in the name of Avi Puder et al. on Mar. 3, 2020, and entitled "Management of Shared Resources in a Software-Defined Storage Environment."

U.S. Appl. No. 16/822,818 filed in the name of Itay Keller et al. on Mar. 18, 2020, and entitled "Storage System Implementing Snapshot Longevity Ranking for Efficient Management of Snapshots."

U.S. Appl. No. 16/822,848 filed in the name of Itay Keller et al. on Mar. 18, 2020, and entitled "Assignment of Longevity Ranking Values of Storage Volume Snapshots Based on Snapshot Policies."

U.S. Appl. No. 16/823,813 filed in the name of Itay Keller et al. on Mar. 19, 2020, and entitled "Managing Incompressible Data in a Compression-Enabled Log-Structured Array Storage System."

U.S. Appl. No. 16/830,469 filed in the name of Roi Tagar et al. on Mar. 26, 2020, and entitled "Storage Block Balancing Using Volume Part Migration."

U.S. Appl. No. 16/830,473 filed in the name of Yugal Peleg Lieblich et al. on Mar. 26, 2020, and entitled "Replicated State Cluster with Standby Node State Assessment During Leadership Transition."

U.S. Appl. No. 16/830,946 filed in the name of Gil Ben Zeev et al. on Mar. 26, 2020, and entitled "Storage Volume Migration Scheduling Based on Storage Volume Priorities and Specified Constraints."

U.S. Appl. No. 16/832,763 filed in the name of Michal Yarimi et al. on Mar. 27, 2020, and entitled "Managing Storage Device Errors During Processing of Inflight Input/Output Requests."

U.S. Appl. No. 16/834,363 filed in the name of Itay Keller et al. on Mar. 30, 2020, and entitled "Managing Least Recently Used Cache Using Reduced Memory Footprint Sequence Container."

U.S. Appl. No. 16/836,824 filed in the name of Itay Keller et al. on Mar. 31, 2020, and entitled "Management of Volume Snapshots in a Data Storage System."

U.S. Appl. No. 16/888,742 filed in the name of Rivka Matosevich et al. on May 31, 2020, and entitled "Balancing Resiliency and Performance by Selective Use of Degraded Writes and Spare Capacity in Storage Systems."

U.S. Appl. No. 16/918,654 filed in the name of Rivka Matosevich et al. on Jul. 1, 2020, and entitled "Sharing Memory Resources Between Asynchronous Replication Workloads."

U.S. Appl. No. 16/983,423 filed in the name of Dan Aharoni et al. on Aug. 3, 2020, and entitled "Deferred Reclamation of Invalidated Entries that are Associated with a Transaction Log in a Log-Structured Array."

U.S. Appl. No. 17/024,912 filed in the name of Anurag Sharma et al. on Sep. 18, 2020, and entitled "Automatic Discovery and Configuration of Server Nodes."

U.S. Appl. No. 17/065,754 filed in the name of Dan Aharoni et al. on Oct. 8, 2020, and entitled "Direct Response to IO Request in Storage System with Remote Replication."

U.S. Appl. No. 17/070,073 filed in the name of Dan Aharoni et al. on Oct. 14, 2020, and entitled "Direct Response to IO Request in Storage System Having an Intermediary Target Apparatus."

U.S. Appl. No. 17/070,288 filed in the name of Anurag Sharma et al. on Oct. 14, 2020, and entitled "Pipeline-Based System for Configuration Checking and Reporting Associated with an Information Processing System."

U.S. Appl. No. 17/071,407 filed in the name of John Moran et al. on Oct. 15, 2020, and entitled "Dynamic Remediation Actions in Response to Configuration Checks in an Information Processing System."

U.S. Appl. No. 17/077,105 filed in the name of Yosef Shatsky et al. on Oct. 22, 2020, and entitled "Volume Tiering in Storage Systems."

U.S. Appl. No. 17/106,988 filed in the name of Rivka Matosevich

(56) References Cited

OTHER PUBLICATIONS et al. on Nov. 30, 2020, and entitled "Managing Host Connectivity to a Data Storage System."

* cited by examiner

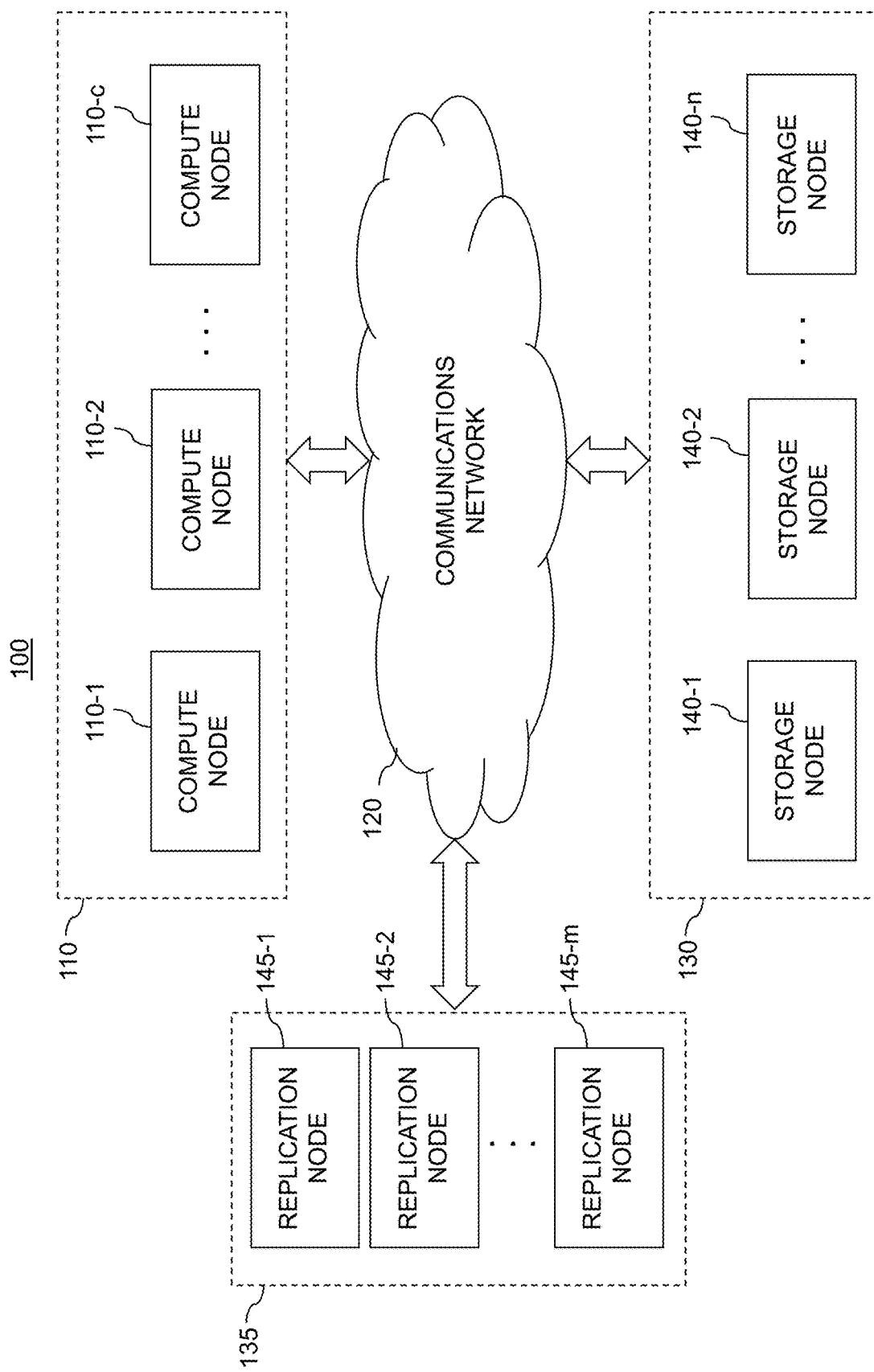

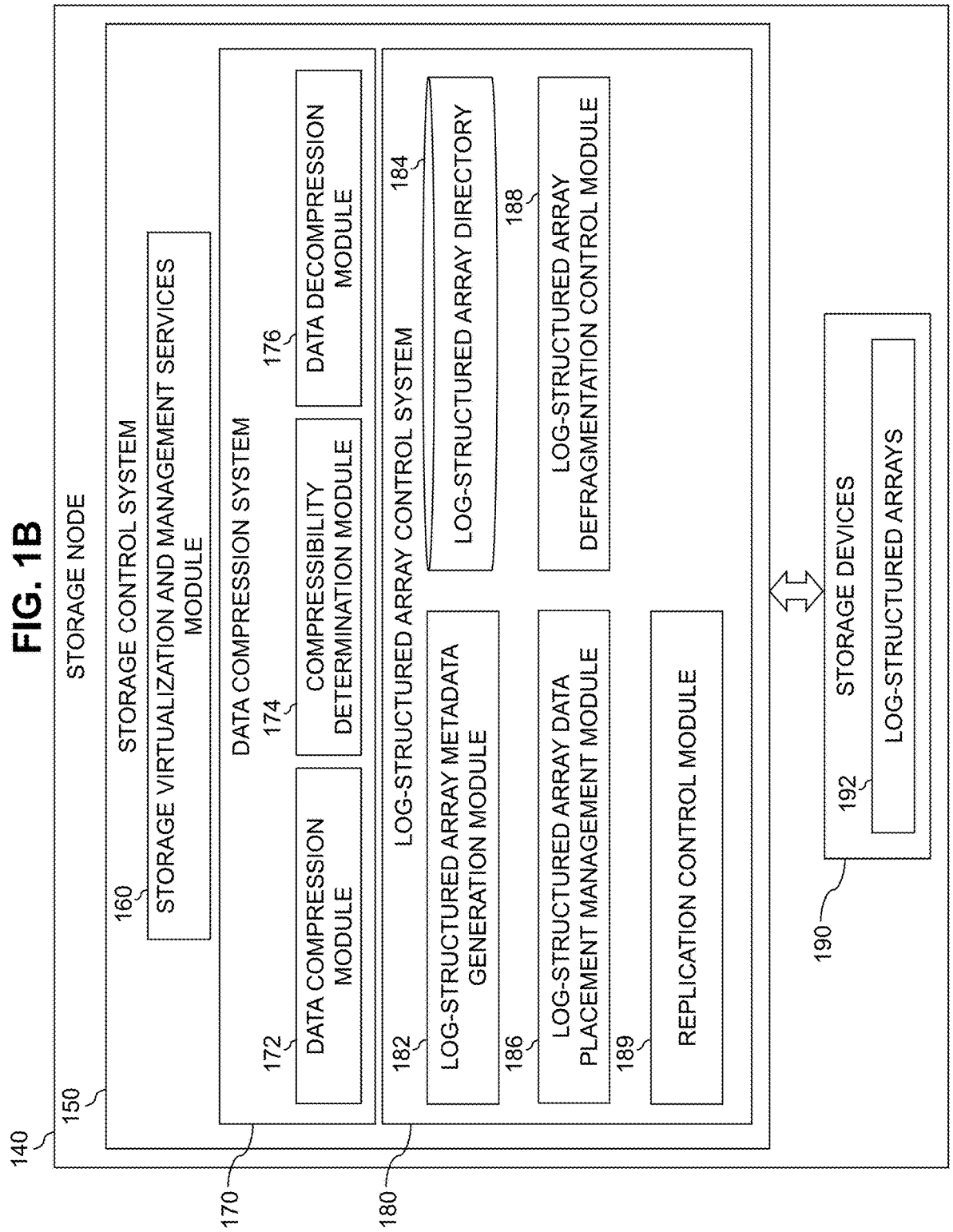

200

300

DEFERRED RECLAMATION OF INVALIDATED ENTRIES ASSOCIATED WITH REPLICATION IN A LOG-STRUCTURED ARRAY

FIELD

This disclosure relates generally to data storage management techniques and, more specifically, to techniques for managing remote replication in a log-structured data storage system.

BACKGROUND

State-of-the-art data storage systems are designed with the goal of enhancing storage efficiency and performance. For example, in some data storage systems, storage efficiency is enhanced by implementing in-line data compression to compress ingress data and store the compressed data to disk, thereby increasing disk storage utilization. While compression-enabled storage systems enhance storage utilization, there are problems associated with implementing in-line data compression in storage systems which are configured to perform "in-place-updates" of stored data where modified data is rewritten to the same storage location as the previous version. Such problems stem from the fact that the amount of compression achieved for a given block of data is dependent on the content of the data and, consequently, data compression generates compressed data of variable sizes. In this regard, when a certain piece of data is updated and rewritten to the same storage location, there is no guarantee that the compressed updated data will be able to fit in the same location on disk that was allocated to the older compressed data before the update. In other instances, the compressed updated data may be smaller in size than the older compressed data, leaving a "gap" in the storage space allocated to the data.

To address these issues, many compression-enabled storage systems implement a log-structured array (LSA) storage layout for storing compressed data. In an LSA layout, the disk storage space is divided into equal-sized blocks, referred to as "logs" or "log segments," into which compressed data is written. In an LSA storage system, whenever a user-offset is written, the data is written in a log entry in a log segment that has enough vacancy to host the data, wherein new data is placed in a new log entry that follows any pre-existing log entry in the log segment. The LSA storage system accommodates the size-change variability of compressed data since data is not allocated to a fixed storage location. Instead, when compressed data in an existing log entry is updated, an "out-of-place update" is performed to rewrite the updated compressed data into a new log entry, and the older existing data is invalidated. Due to the continued creation of invalid log entries over time, the LSA layout requires maintenance defragmentation cycles to close "gaps" in the storage space which result from the invalid entries.

SUMMARY

In some embodiments, a storage system comprises at least one processor coupled to memory. The at least one processor is configured to obtain a write operation issued by an application. The write operation comprises first data associated with a logical data device of the application. The at least one processor is further configured to store the first data in a first entry of a log-structured array implemented on at least one storage device of a storage system and to invalidate a second entry of the log-structured array based at least in part on the storage of the first data in the first entry. The second entry comprises second data associated with the logical data device that was stored in the second entry prior to obtaining the write operation. The at least one processor is further configured to determine that a first indication in log-structured array metadata associated with the log-structured array indicates that the invalidated second entry comprises data that is awaiting replication to a replication storage system and to defer reclamation of the second entry based at least in part on the determination that the first indication in the log-structured array metadata indicates that the invalidated second entry comprises data that is awaiting replication to the replication storage system.

These and other illustrative embodiments include, without limitation, apparatus, systems, methods and processor-readable storage media.

BRIEF DESCRIPTION OF THE DRAWINGS

FIGS. 1A and 1B schematically illustrate an information processing system comprising a storage system according to an exemplary embodiment of the disclosure.

DETAILED DESCRIPTION

Figure 2:
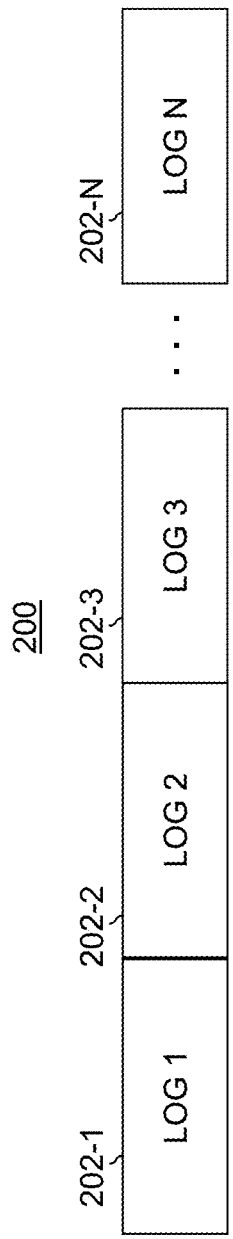
FIG. 2 schematically illustrates a log-structured array which can be created and utilized by a log-structured array control system to store compressed and uncompressed data, according to an exemplary embodiment of the disclosure.

Exemplary embodiments will be described herein with reference to exemplary information processing systems which implement compression-enabled storage systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

FIGS. 1A and 1B schematically illustrate an information processing system comprising a compression-enabled storage system according to an exemplary embodiment of the disclosure. More specifically, FIG. 1A schematically illustrates an information processing system 100 which comprises a plurality of compute nodes 110-1, 110-2, ..., 110-c (collectively referred to as compute nodes 110), a communications network 120, a data storage system 130 and a remote replication data storage system 135. The data storage system 130 comprises a plurality of storage nodes 140-1, 140-2, ..., 140-n (collectively referred to as storage nodes 140, or each singularly referred to as storage node 140). The replication data storage system 135 comprises a plurality of replication nodes 145-1, 145-2, ..., 145-m (collectively referred to as replication nodes 145, or each singularly referred to as replication node 145). In some embodiments, replication nodes 145 may comprise some or all of the functionality of the storage nodes 140.

In the context of the exemplary embodiments described herein, the data storage system 130 comprises a compression-enabled data storage system which supports in-line compression of data that is stored in the storage media that is accessed and controlled by the storage nodes 140. FIG. 1B schematically illustrates an exemplary framework of at least one or more of the storage nodes 140.

In particular, as shown in FIG. 1B, the storage node 140 comprises a storage control system 150 and a plurality of storage devices 190 having storage capacity that is organized into a plurality of log-structured arrays 192. In general, the storage control system 150 implements data storage and management methods that are configured to, e.g., (i) divide the storage capacity of the storage devices 190 into storage pools and logical volumes, (ii) organize the storage capacity of one or more of the storage pools/volumes into an LSA storage architecture which comprises the plurality of log-structured arrays 192, and (iii) store compressed data and non-compressed data in predefined data block sizes (referred to as allocation unit size) in log segments of the log-structured arrays 192 according to an LSA data placement scheme.

To implement such functionalities, the storage control system 150 comprises a storage virtualization and management services module 160, a data compression system 170, and a log-structured array control system 180 (referred to hereafter as LSA control system 180). The data compression system 170 comprises a data compression module 172, a data compressibility determination module 174, and a data decompression module 176, the functions of which will be explained in further detail below. The LSA control system 180 comprises a log-structured array metadata generation module 182, a log-structured array directory 184, a log-structured array data placement management module 186, a log-structured array defragmentation control module 188 and a replication control module 189 the functions of which will be explained in further detail below. It is to be noted that the storage control system 150 may include additional modules and other components typically found in conventional implementations of storage controllers and storage systems, although such additional modules and other components are omitted for clarity and simplicity of illustration.

The compute nodes 110 illustratively comprise physical compute nodes and/or virtual compute nodes which process data and execute workloads. For example, the compute nodes 110 can include one or more server nodes (e.g., bare metal server nodes) and/or one or more virtual machines. In some embodiments, the compute nodes 110 comprise a cluster of physical server nodes or other types of computers of an enterprise computer system, cloud-based computing system or other arrangement of multiple compute nodes associated with respective users. In some embodiments, the compute nodes 110 include a cluster of virtual machines that execute on one or more physical server nodes.

The compute nodes 110 are configured to process data and execute tasks/workloads and perform computational work, either individually, or in a distributed manner, to thereby provide compute services such as execution of one or more applications on behalf of each of one or more users associated with respective ones of the compute nodes. Such applications illustratively issue input-output (I/O) requests that are processed by a corresponding one of the storage nodes 140. The term "input-output" as used herein refers to at least one of input and output. For example, I/O requests may comprise write requests and/or read requests directed to stored data of a given one of the storage nodes 140 of the data storage system 130.

The compute nodes 110 are configured to write data to and read data from the storage nodes 140 in accordance with applications executing on those compute nodes for system users. The compute nodes 110 communicate with the storage nodes 140 over the communications network 120. While the communications network 120 is generically depicted in FIG. 1A, it is to be understood that the communications network 120 may comprise any known communication network such as, a global computer network (e.g., the Internet), a wide area network (WAN), a local area network (LAN), an intranet, a satellite network, a telephone or cable network, a cellular network, a wireless network such as Wi-Fi or WiMAX, a storage fabric (e.g., Ethernet storage network), or various portions or combinations of these and other types of networks.

In this regard, the term "network" as used herein is therefore intended to be broadly construed so as to encompass a wide variety of different network arrangements, including combinations of multiple networks possibly of different types, which enable communication using, e.g., Transfer Control/Internet Protocol (TCP/IP) or other communication protocols such as Fibre Channel (FC), FC over Ethernet (FCoE), Internet Small Computer System Interface (iSCSI), Peripheral Component Interconnect express (PCIe), InfiniBand, Gigabit Ethernet, etc., to implement I/O channels and support storage network connectivity. Numerous alternative networking arrangements are possible in a given embodiment, as will be appreciated by those skilled in the art.

The data storage system 130 may comprise any type of data storage system, or a combination of data storage systems, including, but not limited to, a storage area network (SAN) system, a network attached storage (NAS) system, a direct-attached storage (DAS) system, etc., as well as other types of data storage systems comprising software-defined storage, clustered or distributed virtual and/or physical infrastructure. The term "data storage system" as used herein should be broadly construed and not viewed as being limited to storage systems of any particular type or types. In some embodiments, the storage nodes 140 comprise storage server nodes (e.g., server node 700, shown in FIG. 7) having one or more processing devices each having a processor and a memory, possibly implementing virtual machines and/or containers, although numerous other configurations are possible. In some embodiments, one or more of the storage nodes 140 can additionally implement functionality of a compute node, and vice-versa. The term "storage node" as used herein is therefore intended to be broadly construed, and a storage system in some embodiments can be implemented using a combination of storage nodes and compute nodes.

In some embodiments, as schematically illustrated in FIG. 1B, the storage node 140 is a physical server node or storage appliance, wherein the storage devices 190 comprise DAS resources (internal and/or external storage resources) such as hard-disk drives (HDDs), solid-state drives (SSDs), Flash memory cards, or other types of non-volatile memory (NVM) devices such non-volatile random access memory (NVRAM), phase-change RAM (PC-RAM) and magnetic RAM (MRAM). These and various combinations of multiple different types of storage devices 190 may be implemented in the storage node 140. In this regard, the term "storage device" as used herein is intended to be broadly construed, so as to encompass, for example, SSDs, HDDs, flash drives, hybrid drives or other types of storage media. The storage devices 190 are connected to the storage node 140 through any suitable host interface, e.g., a host bus adapter, using suitable protocols such as ATA, SATA, eSATA, NVMe, SCSI, SAS, etc. In other embodiments, the storage node 140 can be network connected to one or more NAS nodes over a local area network.

The storage control system 150 is configured to manage the storage devices 190 and control I/O access to the storage devices 190 and/or other storage resources (e.g., DAS or NAS resources) that are directly attached or network-connected to the storage node 140. In some embodiments, the storage control system 150 is a component (e.g., storage data server) of a software-defined storage (SDS) system which supports the virtualization of the storage devices 190 by separating the control and management software from the hardware architecture. More specifically, in a software-defined storage environment, the storage control system 150 comprises an SDS storage data server that is configured to abstract storage access services from the underlying storage hardware to thereby control and manage I/O requests issued by the compute nodes 110, as well as to support networking and connectivity. In this instance, the storage control system 150 comprises a software layer that is hosted by the storage node 140 and deployed in the data path between the compute nodes 110 and the storage devices 190 of the storage node 140, and is configured to respond to data I/O requests from the compute nodes 110 by accessing the storage devices 190 to store/retrieve data to/from the storage devices 190 based on the I/O requests.

In a software-defined storage environment, the storage control system 150 is configured to provision, orchestrate and manage the local storage resources (e.g., the storage devices 190) of the storage node 140. For example, the storage control system 150 implements methods that are configured to create and manage storage pools (e.g., virtual pools of block storage) by aggregating capacity from the storage devices 190. The storage control system 150 can divide a storage pool into one or more volumes and expose the volumes to the compute nodes 110 as virtual block devices. For example, a virtual block device can correspond to a volume of a storage pool. Each virtual block device comprises any number of actual physical storage devices, wherein each block device is preferably homogenous in terms of the type of storage devices that make up the block device (e.g., a block device can include only HDD devices or SSD devices, etc.).

In the software-defined storage environment, each of the storage nodes 140 in FIG. 1A can run an instance of the storage control system 150 to convert the respective local storage resources (e.g., DAS storage devices and/or NAS storage devices) of the storage nodes 140 into local block storage. Each instance of the storage control system 150 contributes some or all of its local block storage (HDDs, SSDs, PCIe, NVMe and flash cards) to an aggregated pool of storage of a storage server node cluster (e.g., cluster of storage nodes 140) to implement a server-based storage area network (SAN) (e.g., virtual SAN). In this configuration, each storage node 140 is part of a loosely coupled server cluster which enables "scale-out" of the software-defined storage environment, wherein each instance of the storage control system 150 that runs on a respective one of the storage nodes 140 contributes its local storage space to an aggregated virtual pool of block storage with varying performance tiers (e.g., HDD, SSD, etc.) within a virtual SAN.

In some embodiments, in addition to the storage control systems 150 operating as SDS storage data servers to create and expose volumes of a storage layer, the software-defined storage environment comprises other components such as (i) SDS data clients that consume the storage layer and (ii) SDS metadata managers that coordinate the storage layer, which are not specifically shown in FIG. 1A. More specifically, on the client-side (e.g., compute nodes 110), an SDS data client (SDC) is a lightweight block device driver that is deployed on each server node that consumes the shared block storage volumes exposed by the storage control systems 150. In particular, the SDCs run on the same servers as the compute nodes 110 which require access to the block devices that are exposed and managed by the storage control systems 150 of the storage nodes 140. The SDC exposes block devices representing the virtual storage volumes that are currently mapped to that host. In particular, the SDC serves as a block driver for a client (server), wherein the SDC intercepts I/O requests, and utilizes the intercepted I/O request to access the block storage that is managed by the storage control systems 150. The SDC provides the operating system or hypervisor (which runs the SDC) access to the logical block devices (e.g., volumes).

The SDCs have knowledge of which SDS control systems (e.g., storage control system 150) hold its block data, so multipathing can be accomplished natively through the SDCs. In particular, each SDC knows how to direct an I/O request to the relevant destination SDS storage data server (e.g., storage control system 150). In this regard, there is no central point of routing, and each SDC performs is own routing independent from any other SDC. This implementation prevents unnecessary network traffic and redundant SDS resource usage. Each SDC maintains peer-to-peer connections to every SDS storage control system 150 that manages the storage pool. A given SDC can communicate over multiple pathways to all of the storage nodes 140 which store data that is associated with a given I/O request. This multi-point peer-to-peer fashion allows the SDS to read and write data to and from all points simultaneously, eliminating bottlenecks and quickly routing around failed paths.

The SDS metadata manager components are deployed on multiple server nodes and operate in a manner which forms a tightly coupled cluster that is configured to supervise the operations of the storage cluster and manage storage cluster configurations. The SDS metadata managers operate outside of the data path and provide the relevant information to the SDS clients and storage servers to allow such components to control data path operations. The SDS metadata managers are configured to manage the mapping of SDC data clients to the SDS data storage servers. The SDS metadata managers manage various types of metadata that is required for system operation of the SDS environment such as configuration changes, managing the SDS data clients and data servers, device mapping, values, snapshots, system capacity including device allocations and/or release of capacity, RAID protection, errors and failures, and system rebuild tasks including rebalancing.

Regardless of the specific implementation of the storage environment, as noted above, the various modules of the storage control system 150 of FIG. 1B collectively provide data storage and management methods that are configured to, e.g., (i) divide the storage capacity of the storage devices 190 into storage pools and logical volumes, (ii) organize the storage capacity of the storage pools/volumes pools into the plurality of log-structured arrays 192, and (iii) store compressed data and non-compressed data in log segments of the log-structured arrays 192. In particular, the storage virtualization and management services module 160 implements any suitable logical volume management (LVM) system which is configured to create and manage local storage volumes by aggregating the storage devices 190 into one or more virtual storage pools that are thin-provisioned for maximum capacity, and logically dividing each storage pool into one or more storage volumes that are exposed as block devices (e.g., raw logical unit numbers (LUNs)) to the compute nodes 110 to store data.

In some embodiments, the storage pools are primarily utilized to group storage devices based on device types and performance. For example, SSDs are grouped into SSD pools, and HDDs are grouped into HDD pools. Furthermore, in some embodiments, the storage virtualization and management services module 160 implements methods to support various data storage management services such as data protection, data migration, data deduplication, replication, thin provisioning, snapshots, data backups, etc.

The data compression system 170 is configured to support in-line compression of data that is written to the LSA storage, and in-line decompression of compressed data that is read from the LSA storage. In particular, the data compression module 172 implements one or more types of data compression techniques to compress I/O write data that is provided with an I/O write request. For a write I/O operation, the associated I/O write data is divided into blocks, and each block is separately compressed by the data compression module 172. The data compression module 172 can implement one more data compression techniques including, but not limited to, Lempel-Ziv (LZ) compression, Lempel-Ziv-Welch (LZW) compression, other variants of LZ compression, Huffman encoding, run-length encoding, etc., and other types of data compression techniques which are suitable for the expected types of data that are to be stored for a given application.

The data decompression module 176 is configured to decompress compressed data that is read from the LSA storage in response to I/O read requests. In particular, when compressed data is accessed from the LSA storage, the compressed data is input to the data decompression module 176 and decompressed using a decompression process which corresponds to the process that was used to compress the data. The decompressed data is then returned in response to the I/O read request.

The compressibility determination module 174 is configured to determine the "compressibility" of data that is to be written to the LSA storage. With regard to a given block of I/O write data, the term "compressibility" as used herein broadly refers to (i) a level of data compression that can be obtained for the given block of I/O write data or (ii) a degree to which a size of the given block of I/O write data can be reduced by data compression. The data placement techniques implemented by the LSA control system 180 are based, in part, on the understanding that not all data is compressible. For example, when data compression is performed on data that is essentially incompressible, the size of the resulting "compressed" data may be the same or greater than the size of the original, non-compressed data. For example, incompressible data can include pre-compressed content (e.g., compressed audio and video), or pure random data.

The compressibility of I/O write data can be determined in various ways. For example, in some embodiments, any compression product that yields a size which is greater than some predefined size threshold T is deemed, in effect, to be incompressible:

$$IsCompressible(\text{data}) = \begin{cases} \text{TRUE}, & \text{size}(\text{compress}(\text{data})) \le T \\ \text{FALSE}, & \text{otherwise} \end{cases}$$

In other embodiments, the compressibility of I/O write data can be determined by (i) computing a "compressibility value" as a function of a size of the I/O write data and a size of the compressed I/O write data, and (ii) comparing the computed "compressibility value" to a predefined "compressibility threshold value" to determine whether a level of data compression of the compressed I/O write data meets or exceeds a target minimum level of data compression. For example, in some embodiments, a compressibility value of I/O write data can be expressed in terms of a compression ratio R value, which is computed as a ratio of the size of the original (non-compressed) I/O write data to the size of the compressed I/O write data, as follows:

$$CompressionRatio(\text{data}): R = \frac{\text{size}(\text{data})}{\text{size}(\text{compress}(\text{data}))}$$

For example, a data compression process which compresses data from a size of 20 Kilobytes (KB) to a size of 4 KB yields a compression ratio R of 20/4=5, or a ratio of 5:1. In this instance, any compression product that yields a compression ratio R which is greater than or equal to a predefined compression ratio threshold $R_{Threshold}$ can be deemed compressible, while any compression product that yields a compression ratio R which is less than the predefined compression ratio threshold $R_{Threshold}$ is deemed, in effect, to be incompressible. In some embodiments, the compression ratio threshold $R_{Threshold}$ may be 1.25. In this embodiment, the compression ratio threshold $R_{Threshold}$ is an exemplary "compressibility threshold value."

In other embodiments, the compressibility of I/O write data can be determined based on a computation of a compressibility value C, where $$C = 1/R = \frac{\text{size}(\text{compress}(\text{data}))}{\text{size}(\text{data})}.$$

For example, assuming the data compression process results in the reduction of the size of data from 20 KB to 4 KB, the computation of the compressibility value C=4/20, yields of value of 0.2. The compressibility value C can be compared to a predefined compressibility threshold value $C_{Threshold}$ to determine if a given block of data is deemed compressible or incompressible. For example, in some embodiments, an exemplary compressibility threshold value is set to $C_{Thresh-}$ $_{old}$=0.8 (which corresponds to a compression ratio R=1.25). In this instance, any compression product that yields a compressibility value C which is less than or equal to $C_{Threshold}$ is deemed compressible, while any compression product that yields a compressibility value C which is greater than $C_{Threshold}$ is deemed, in effect, to be incompressible.

In other embodiments, a "compressibility value" for I/O write data can be expressed in terms of a space savings value S, which represents a reduction in the size of the compressed I/O write data relative to the non-compressed size of the I/O write data. In particular, the space savings value S is computed as follows:

$$SpaceSavings(\text{data}): S = 1 - \left( \frac{\text{size (compress (data))}}{\text{size (data)}} \right)$$

For example, assuming a data compression process results in the reduction in the size of I/O write data from 20 KB to 4 KB, the computation of S=1−(4/20) yields a space savings value S of 0.8 (or 80%). The space savings value S can be compared to a predefined space savings threshold value $S_{Threshold}$ to determine if a given block of data is deemed compressible or incompressible. For example, in some embodiments, an exemplary space savings threshold value is set to $S_{Threshold}$=0.2 (which corresponds to $C_{Threshold}$=0.8 or $R_{Threshold}$=1.25). The value of $S_{Threshold}$=0.2 corresponds to at least a 20% reduction in the size of the compressed I/O write data relative to the non-compressed size of the I/O write data. In this instance, any compression product that yields a space savings value S which is greater than or equal to $S_{Threshold}$ is deemed compressible, while any compression product that yields a space savings value S which is less than $S_{Threshold}$ is deemed, in effect, to be incompressible. In this embodiment, the space savings threshold value $S_{Threshold}$ is an exemplary "compressibility threshold value."

In general, LSA control system 180 creates and manages the log-structured arrays 192 within the storage pools/volumes of the storage devices 190. For example, FIG. 2 illustrates a log-structured array 200 which can be created and utilized by the LSA control system 180 to store compressed and uncompressed data. The log-structured array 200 comprises an array of N log segments 202-1, 202-2, 202-3, . . . , 202-N (collectively, or individually referred to as log segments 202, or logs 202). In some embodiments, the log-structured array 200 is implemented in one or more block storage devices, wherein each block storage device comprises a physical storage space divided into a plurality of logical data blocks (e.g., fixed-size allocation units), wherein the logical data blocks each comprise a separately addressable unit of the physical storage space with a specified block size (e.g., allocation unit size). Each logical data block (e.g., allocation unit) comprises a same number of one or more physical data blocks of the underlying storage media.

In the LSA layout, each log segment 202 of the log-structured array 200 comprises a set of contiguous logical data blocks of the physical storage space. The log segments 202 can reside in the same block device or be distributed over multiple block devices, depending on the configuration of the block storage devices. In some embodiments, the log segments 202 are equal in size (e.g., the log segments 202 each include the same number of logical data blocks). For example, assuming that each logical block (e.g., cluster of sectors on HDD, or page of SSD) is 4 KB, and that each log segment 202 has a segment size of 256 KB, then each of the N log segments 202 comprises a consecutive sequence of 64 logical data blocks within the LSA storage space.

Whenever a user-offset is written to a logical block address, the data is placed in a given log segment 202 which has enough vacancy to host the data. For example, when new data is written to LSA storage, the new data is appended to the end of a given log segment 202 which has sufficient room. In addition, metadata updates comprising log indexing information and other types of metadata are also appended to the given log segment 202 when data is written to the given log segment 202. In this regard, each log segment 202 will include a sequence of appended data entries comprising blocks of data and blocks of indexing metadata. Furthermore, when a modified data block comprising non-compressed data is re-written to LSA storage, the modified data block may be written to the same log entry location(s) as the original data (referred to as "in-place update"). On the other hand, when a modified data block comprising compressed data is rewritten to the LSA storage, the modified data may be written to one or more new log entry locations in a log segment which has vacancy (referred to as "out-of-place update"), wherein an out-of-place update invalidates the original compressed data that is held in one or more existing log entries. In some cases, modifications for both uncompressed and compressed data may be written to one or more new log entry locations in a log segment which has vacancy, e.g., out-of-place updates may be utilized for modifications to both uncompressed and compressed data.

The log-structured array metadata generation module 182 (hereafter referred to as LSA metadata generation module 182) is configured to generate log metadata that is included in metadata log entries that are appended to data entries in the log segments of the log-structured arrays 192. The log metadata entries comprise indexing information (e.g., pointers) that is included within the log segment to provide fast random access to data entries within the log segments, as well as information that describes the data entries (e.g., valid, not valid, compressed, uncompressed, etc.) within the log segment, and other information such as checksums for error detection, etc. The type of information and data structures that are used to implement the log metadata will vary depending on the application. For example, in some embodiments, the log metadata can be implemented using hash table data structures, B-tree data structures, bitmaps, linked-lists, or other suitable data structures for organizing the log indexing information.

The log-structured array directory 184 (hereafter referred to as LSA directory 184) stores mapping information which maps logical block addresses to physical block addresses of log entries within the log-structured arrays 192. In some embodiments, the LSA directory 184 is maintained in non-volatile system memory. In some embodiments, the logical block addresses of logical devices are mapped to physical data entries in the log-structured array 192. The LSA directory 184 provides information that maps each logical block address to a current block location in the log-structured arrays 192. For example, an entry in the LSA directory 184 for a given logical block provides the physical ID and location of the log segment which stores the logical block, the starting location in the log segment (offset) and length in physical device units (e.g., sectors) to which the logical block is mapped. The LSA directory 184 can be implemented using any suitable type of directory data structure and directory implementation algorithm. For example, in some embodiments, the LSA directory 184 can implement a hash table which comprises key-value pairs, as is known in the art. In some embodiments, the directory information within the LSA directory 184 is used to determine the location of a given log segment that holds the data of a given logical block, while the metadata indexing entries within the given log segment are utilized to determine the location of the corresponding data within the log segment.

The log-structured array data placement management module 186 (hereafter, referred to as LSA data placement management module 186) implements methods for storing both compressed and non-compressed data entries within log segments of the log-structured arrays 192 in a way that minimizes I/O amplification (e.g., read amplification and write amplification) and enhances overall data access and management efficiency. The term "I/O amplification" refers to a broad set of circumstances in which an I/O request triggers multiple, undesirable I/O operations (e.g., the file system needs to perform multiple I/O operations to successfully service the initial I/O request). For example, a "read-modify-write" is one type of write operation that leads to I/O amplification because such write operation requires performing a read operation to read an entire logical data block (allocation unit) of existing data, modifying a portion of the data within the logical data block, and then rewriting the entire logical data block with the modified data back to disk. The "read-modify-write" process increases both read and write amplification due to the need to read extra data that is not the target of the I/O write request, and then rewrite such extra (unmodified) data along with the modified data back to disk.

The log-structured array defragmentation control module 188 (hereafter referred to as LSA defragmentation control module 188) implements methods for defragmenting log segments within the log-structured arrays 192. The physical location of data within log segments of the log-structured arrays 192 will change over time as a result of out-of-place writes that are performed by the LSA data placement management module 186 when writing modified blocks of compressed data to new log entries that are appended to the end of a given log segment. The out-of-place writes result in invalid blocks of data which cannot be reused until they are reclaimed. In addition, due to the runtime variation of data compressibility, some or all data entries that contain compressed data can have unused storage space that remains after filling the data entries with compressed data. The invalid data entries (and their corresponding metadata entries) together with the unused space in data entries with compressed data collectively form "gaps" in the log segments. The LSA defragmentation control module 188 periodically performs a defragmentation process to consolidate such "gaps" into free storage space within the log segments that can be used to store new data.

Figure 3:
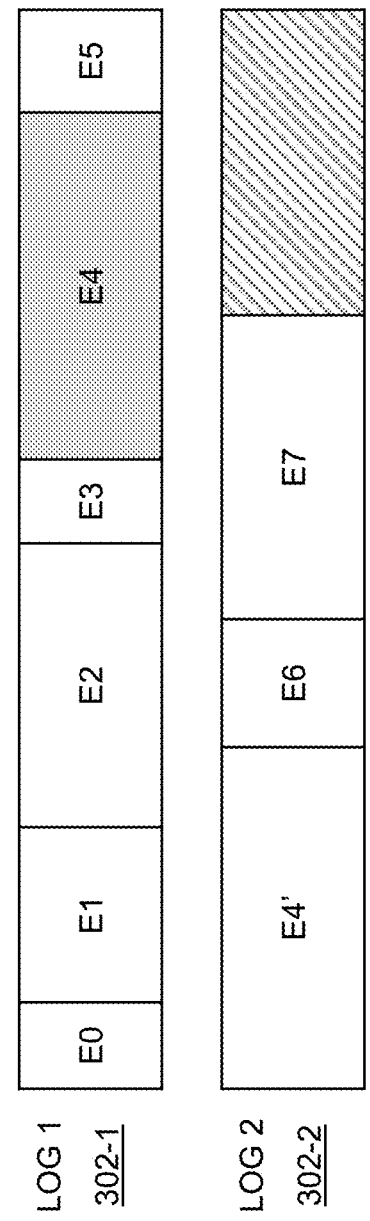
FIG. 3 schematically illustrates a log-structured array comprising multiple log segments, and a data placement process for storing compressed data in log entries of the log segments.

In a conventional compression-enabled storage system which utilizes an LSA storage architecture to store compressed data, whenever a user-offset is written, the compressed data is placed into a log segment that has enough vacancy to host the compressed data. In particular, the new data is placed into a new log entry that is appended to the last log entry of the log segment. For example, FIG. 3 schematically illustrates a log-structured array comprising multiple log segments, and a conventional process for storing compressed data into log entries of the log segments. In particular, FIG. 3 illustrates a log-structured array 300 comprising a plurality of log segments (or logs) including a first log segment 302-1 (LOG 1) and a second log segment 302-2 (LOG 2), wherein each log segment 302-1 and 302-2 comprises a plurality of log data entries, generally denoted E(i).

In particular, the first log segment 302-1 comprises log data entries E0, E1, E2, E3, E4, and E5, and the second log segment 302-2 comprises log data entries E4', E6, and E7. The log data entries E(i) are shown to have variable sizes as the log data entries store compressed data. For ease of illustration, the metadata descriptors of the log data entries are not shown. The shaded region of the first log segment 302-1 represents a region with invalid (stale) data, and the striped region within the second log segment 302-2 represents a "logically" vacant region (e.g., logical data blocks that are vacant and can be used to store new data entries). FIG. 3 illustrates a state in which the compressed data of the log data entry E4 in the first log segment 302-1 has been updated and rewritten into the second log segment 302-2 as log data entry E4'. In this instance, the log data entry E4 is no longer valid, thus resulting in a "gap" in the first log segment 302-1.

In a conventional LSA storage system which stores compressed data, whenever a user-offset is rewritten (e.g., the log data entry E4 of the first log segment 302-1 is rewritten to the new log data entry E4' in the second log segment 302-2), no effort is made to fit the new data into the location (log entry) of the older data. Instead, an out-of-place write is performed to store the updated/modified data in the next available log that has sufficient vacancy to hold the new data, similar to a new write. This allows the LSA storage system to accommodate the size-change variability of compressed data since data is not allocated to a fixed storage location. As noted above, due to the continued creation of invalid log entries over time, the LSA layout requires maintenance defragmentation cycles to close "gaps" in the storage space which result from the invalid entries.

A defragmentation process involves rewriting a large portion of a log segment, or the entire log segment, after packing the valid log data entries together, such that all gaps in the log segment are closed, and all vacant regions of the log segment become contiguous. The implementation of the LSA layout, together with the necessity to have defragmentation cycles, imposes new challenges with regard to certain types of storage media in which write amplification enhances the gradual wearing of the storage devices, ultimately rendering the devices unusable. This is the case with SSD storage media, which are becoming increasingly popular because of their superior access times as compared to magnetic disks. The write operations involved in the defragmentation cycles, where the same data is rewritten just for the sole purpose of maintenance, constitutes undesirable write amplification.

The LSA layout is popular with SSDs where an even distribution of the writes is a requirement in order to ensure uniform wear of the cells composing the storage devices 190. In an LSA layout, writes are always written to the next available log of the LSA having sufficient space to store the write as opposed to "write in place" layouts where writes are always written to a specific physical address on the storage devices 190. In an LSA layout, a rewrite to a pre-written logical address will write the data in a new physical location and the old data will be invalidated in the metadata. In practice the old data is not deleted from the storage devices 190 until the specific physical space is required for new writes issued to that storage device 190.

One of the most common applications that are run on compute nodes are database (DB) applications. There are many types of databases, e.g., sql, non sql, in memory, etc., but they are all used for storing data in an efficient manner. The consistency of a DB is a key feature and requires that updates be performed in the proper order to ensure that the right data is stored in the right place. To preserve consistency and allow roll back, the transactions are first synchronously written to a logical log device, e.g., volume, via log record writes which include numerous transactions. After the log record writes are acknowledged, the logical data devices, e.g., volumes, with the DB tables are also updated with the new updates.

The cost of these logical log devices can be high in both capacity and performance. The capacity is based on the transaction rate and the number of transactions the user may need to be able to roll back which may require significant extra capacity just for preserving the capability to roll back the transactions. For example, in terms of performance impact, every DB update/change needs to be duplicated, one write to the logical log device and another write to the logical data devices. These extra writes consume CPU cycles, drive cycles and network bandwidth. In addition, the storage of the logical log devices in physical memory require the allocation of additional memory resources. Eliminating the need to perform these extra writes can double the storage write performance of the storage system in most cases.

Backing up data in a remote data storage system is also a feature that may be available to users or applications that utilize a data storage system. The consistency of the replication of data to the remote replication data storage system may require that the replication data updates be performed in the proper order to ensure that the right data is stored on the replication data storage system. In a typical data storage system, to preserve consistency and allow roll back, any transactions to be sent to the replication data storage system are typically written to a replication logical log device, e.g., a volume, via replication log device writes. The replication logical log device may also be sometimes referred to as a replication journal.

To avoid the complexity and overhead of keeping track of the exact order for every transaction, the transactions are often grouped together in into groups, sometimes also referred to as cycles or barriers, and then provided to the replication data storage system together. In the event of a failure in the data storage system, the last complete group is ensured to be consistent. These groups are typically sent to the replication data storage system and once they are acknowledged by the replication data storage system as having been safely received and handled, the group can be discarded from the replication logical log device by the data storage system. This process may be done in parallel to the process described above for handling the database transactions.

The cost of these replication logical log devices can be high in both capacity and performance. The capacity is based on the transaction rate and the number of transactions that are awaiting replication to the replication data storage system 135 which may require significant extra capacity just for preserving the orderly replication of the transactions. For example, in terms of performance impact, every DB update/change needs to be replicated to the replication data storage system 135, which may require additional duplication, for example, an additional write to the replication logical log device in addition to any write to the database logical log device or the write to the logical data devices. These extra writes consume CPU cycles, drive cycles and network bandwidth. In addition, the storage of the replication logical log devices in physical memory require the allocation of additional memory resources. For example, if the bandwidth for incoming transactions on the data storage system is 2 GB/s, the replication logical log devices need to hold at least three hours of data, the replication logical log devices may need to be allocated 22 TB of physical memory for one direction. This may be doubled for bi-directional replication. Eliminating the need to perform these extra writes may improve the storage write performance of the data storage system in most cases while eliminating the need to store additional data on the physical memory may free up that memory for use by the logical data devices. For example, in some embodiments, the write performance may be doubled by eliminating the need to duplicate the writes to a replication logical log device just for sending the data to the replication data storage system 135.

In addition, additional writes may be required to manage the metadata associated with the replication logical log device. These extra writes may also consume processing and network resources such as, e.g., CPU cycles, drive cycles and network bandwidth. Eliminating these extra metadata writes may double the storage write performance in some cases. For example, if the write operation obtained from the compute node is a large write I/O operation, the limit on the data storage system 130 may be a bandwidth of the communications network 120 or other network components of the data storage system 130. In such a case, adding another write operation to the replication logical log device or the metadata associated with the replication logical log device may double the overhead on the network. Eliminating such additional write operations may therefore potentially double the performance of the data storage system 130.

The LSA layout described above may be utilized to service the needs of compute nodes 110 for providing database and replication services to end users. For example, the end user may access the compute node 110 and provide data for storage in the data storage system 130. The compute nodes 110 may store this data in a logical database structure for easy retrieval. On the data storage system 130, the data is physically stored in the log segments 202 using the LSA layout described above and the storage location is mapped to the entries in the logical database structure, e.g., using a logical address to physical address mapping data structure of the data storage system 130. In addition, the data is also replicated and physically stored on the replication data storage system 135 to allow for rollback or reconstruction of the database in the case of a data failure at the data storage system 130. The replication data storage system 135 may utilize the LSA layout or any other storage layout for storing the replicated data.

In illustrative embodiments, LSA metadata generation module 182 and LSA data placement management module 186 may reduce the amount of data that needs to be stored on the LSAs 192 by removing the need to store duplicate data for both the replication logical log devices and the logical data devices. For example, since an entry in a log segment 202 that is invalidated due to a change in the corresponding logical data device is not physically deleted from the log segment 202 right away when new data is written to another log segment 202 of the LSAs 192, the invalidated data entry may be utilized by the LSA metadata generation module 182 for replication log purposes, thereby removing the need for the LSA data placement management module 186 to store duplicate data for the replication logical log devices.

In such an embodiment, only the data associated with logical data devices need be stored in the LSAs 192 while the corresponding replication logical log device is handled by the LSA control system 180 in metadata. For example, LSA metadata generation module 182 may be configured to maintain metadata that tracks the entries in the LSAs 192 which comprise data corresponding to writes to the logical data devices and also tracks entries in the LSAs 192 that are invalidated due to rewrites or other operations. The metadata may then be utilized by the LSA control system 180 to identify the data that corresponds to the replication logical log devices of the database application. For example, the data that corresponds to the replication logical log devices may comprise data stored in valid entries of the LSAs 192 that are currently being used for the logical data devices and data stored in invalidated entries of the LSAs 192 that have not yet been reclaimed by the LSA defragmentation control module 188 of the LSA control system 180. Because the data for the relevant replication transactions is still available even after a particular entry has been invalidated, there is no need to separately store data on the LSAs 192 for the replication logical log devices.

Figure 4:
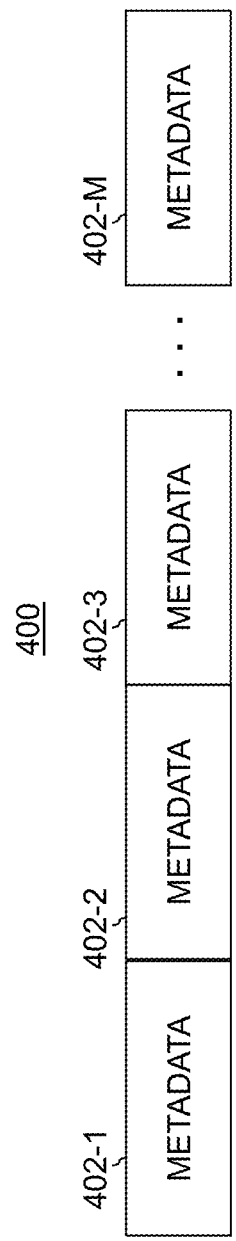
FIG. 4 schematically illustrates a data structure comprising LSA metadata entries according to an exemplary embodiment of the disclosure.

With reference to FIG. 4, a data structure 400 comprises LSA metadata entries 402-1, 402-2, 402-3 . . . 402-M each of which comprises metadata that corresponds to a log segment 202 of the LSAs 192. For example, the metadata in the LSA metadata entries 402 may comprise an indication of whether or not a corresponding entry of the corresponding log segment 202 comprises data associated with the replication log. In some embodiments, the metadata may comprise a bitmap for each log segment 202 where each bit corresponds to one of the entries of the log segment 202. For example, if a particular entry of a log segment 202 comprises data that corresponds to the replication log, the corresponding bit in the bitmap associated with that log segment 202 may be set to a predetermined value, e.g., 1 or 0. In some embodiments, other types of data structures may alternatively be utilized such as, e.g., linked-lists, arrays, or any other data structure that may store information.

In illustrative embodiments, the LSA defragmentation control module 188 may be configured to utilize the data structure 400 when determining whether or not to reclaim invalidated entries of a log segment 202. For example, if an invalidated log entry of a log segment 202 has a corresponding indication in the metadata of the data structure 400 that the data is being utilized for the replication log, LSA defragmentation control module 188 will not release that entry for use by new log entries.

In a typical database application, the number of transactions which are stored in the replication log and needed for replication purposes may be configured based on a variety of criteria. For example, the replication log may be configured to comprise a predetermined number of transactions, a predetermine size of transactions, all transactions within a pre-determined period of time, or other similar criteria. As an example, the replication log may be configured to comprise the last 50 transactions, the last 100 GB worth of transactions, all transactions from the last 15 minutes, or any other criteria. In some cases, for example, the database application may specify the criteria for what transactions are stored in the replication logical log devices of the replication log for replication to the replication data storage system 135.

The data structure 400 is utilized to ensure that any invalidated entries of the log segments 202 that correspond to transactions in the replication log are not being reclaimed by the LSA defragmentation control module 188 until the log record of the replication log for those entries is provided to the replication data storage system 135. For example, if the LSA metadata entries 402 of the data structure 400 comprise bitmaps that track the writes for each log segment 202, there will be a bitmap for log segment 202-1, a bitmap for log segment 202-2, a bitmap for log segment 202-3 . . . and a bitmap for log segment 202-N. Each LSA metadata entry 402 will include indications of the writes that comprise the replication log record for the corresponding log segment 202, e.g., by setting the corresponding bits in the bitmap. For example, an LSA metadata entry 402 may include indications of which entries in a log segment 202 correspond to writes that have been invalided by a rewrite that came in a later transaction.

By utilizing the invalidated entries in the log segment 202 for the replication log, e.g., rewrites to the same logical address that need to still be replication to the replication data storage system 135, the required overhead for maintaining the replication log is much lower as compared to storing duplicate data on the LSAs 192 for separate replication logical log devices. For example, the LSA metadata entries 402 of the data structure 400 such as, e.g., bitmaps, consume very little space in the data storage system 130 as compared to duplicate storage of the data corresponding to the replication logical log devices. As an example, if a bitmap is utilized, only one bit per 4 KB of data, or any other entry size in a log segment 202, is required and may be stored in non-volatile memory such as, e.g., on-volatile dual in-line memory module (NVDIMM) or other non-volatile memory, storage class memory, or other types of memory. In some cases, the data structure 400 may also or alternatively be stored on the storage devices 190 themselves.

Figure 5:
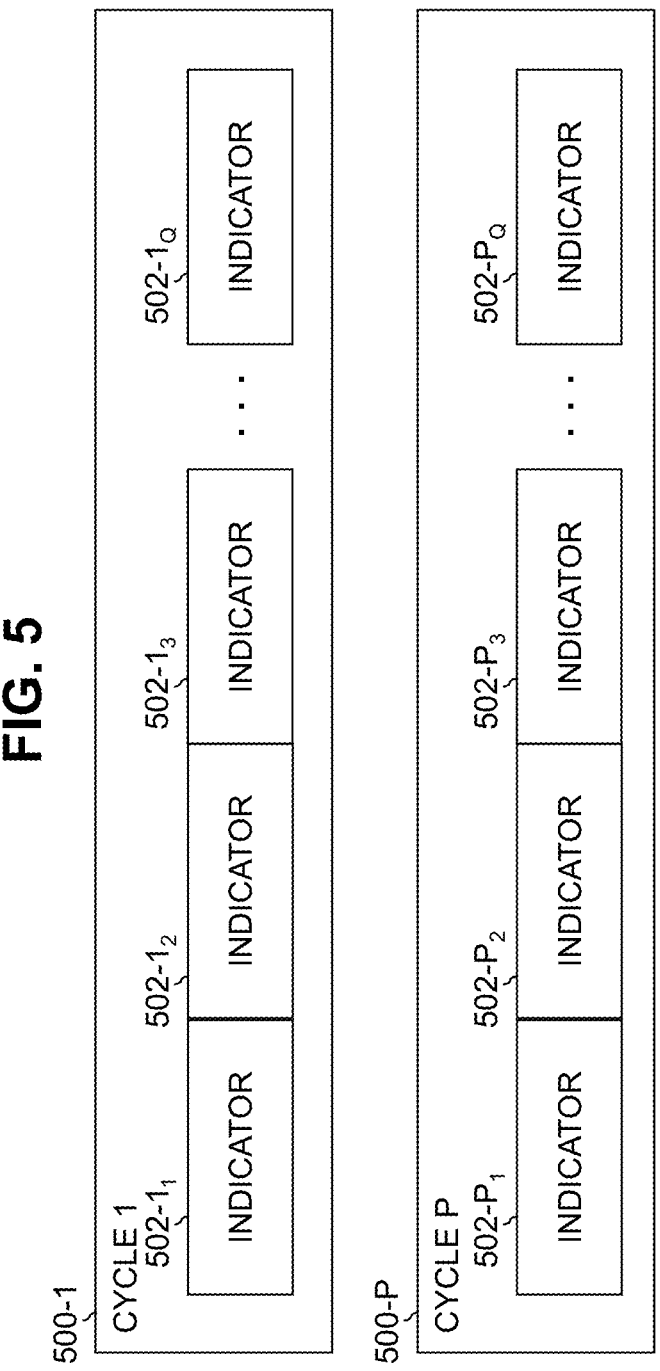
FIG. 5 schematically illustrates data structures comprising replication metadata entries according to an exemplary embodiment of the disclosure.

With reference now to FIG. 5, data structures 500-1 . . . 500-P, e.g., linked lists, arrays, or any other data structures, are utilized to point to and track the write transactions for each cycle that will be replicated to the replication data storage system 135 (collectively referred to as data structures 500, or each singularly referred to as a data structure 500). Each data structure 500 comprises replication metadata that comprises a plurality of indicators 502 (collectively referred to as indicators 502, or each singularly referred to as an indicator 502). For example, indicators 502 may comprise indicators $502-1_1$, $502-1_2$, $501-1_3$ . . . $502-1_Q$ (collectively referred to as indicators 502-1, or each singularly referred to as an indicator 502-1) in the case of data structure 500-1 and indicators $502-P_1$, $502-P_2$, $502-P_3$ . . . $502-P_Q$ (collectively referred to as indicators 502-P, or each singularly referred to as an indicator 502-P) in the case of data structure 500-P. The indicators 502 of each data structure 500 are grouped into a cycle that corresponds to a group of write transactions that will be replicated to the replication data storage system 135 together, e.g., cycle 1 for data structure 500-1 and cycle P for data structure 500-P. In some embodiments, an indicator 502 may comprise a pointer to the entry E of a log segment 302 that comprises the corresponding write transaction that needs to be replicated. In some embodiments, an indicator 502 may also alternatively comprise a bit or flag that indicates that the corresponding write transaction is associated with the cycle for that data structure 500.

In an illustrative embodiment, two data structures 500, e.g., data structures 500-1 and 500-P, may be utilized for tracking the write transactions for corresponding cycles, e.g., cycles 1 and P, and may be sufficient for the replication of data to the replication data storage system 135. For example, the indicators 502-1 of data structure 500-1 that correspond to cycle 1 may be filled with pointers or other indicators that correspond to incoming writes that are stored in the logical data devices of the LSAs 192. When cycle 1 is ready to be replicated as a group to the replication data storage system 135, the data storage system 130 may transfer the handling of incoming writes from data structure 500-1 to data structure 500-P such that the indicators 502-P of data structure 500-P corresponding to cycle P are now being filled with pointers or other indications corresponding to the incoming writes. In this manner, one data structure 500, e.g., data structure 500-P, may be storing indications 502 corresponding to incoming write operations while the other data structure 500, e.g., data structure 500-1, is being utilized to replicate write operations for a cycle that is ready for replication to the replication data storage system 135. In other embodiments more data structures 500 may be utilized where P may represent any number of data structures. In such a case, one or more data structures 500 may be utilized to store indications corresponding to incoming write operations while one or more other data structure 500 may be utilized to replicate write operations for cycles that are ready for replication.

The indicators 502 of each data structure 500 correspond to the write operations that were added to the data storage system 130 during the time the corresponding cycle was open. As an example, a cycle may be closed and ready for replication after a threshold amount of time or after the cycle has accumulated enough write operations to meet a predetermined threshold capacity either in number of operations or cumulative data size. For example, in some embodiments, a cycle may be closed after a threshold amount of time worth of write operations have occurred such as, e.g., 15 seconds or any other amount of time. In other embodiments, a cycle may be closed after a threshold number of write operations have been grouped into that cycle, e.g., 50 write operations or any other number of write operations. In yet other embodiments, a cycle may be closed when a threshold cumulative data size of the write operations that correspond to the cycle have been stored on the logical data devices, e.g., 5 GB or any other amount. In some embodiments multiple thresholds may be utilized at the same time where, for example, the cycle may be closed when either the threshold amount of time as passed, when the threshold number of write operations have been grouped into that cycle or when the threshold cumulative data size of the write operations that correspond to the cycle have been stored on the logical data devices, whichever occurs first.

The write operations that are grouped into a cycle may comprise write operations that have been invalided by later rewrites in a future cycle. In some cases, for example, cycles are closed, replicated and recycled for further use in association with incoming write operations within seconds, minutes or hours depending on the threshold criteria and the availability of the replication data storage system 135 for receiving the replication data corresponding to the cycle. In such cases, the number of invalidated operations included in a cycle will often be relatively small, e.g., less than 20%, 30% or any other portion of the cycle. This may occur because most rewrites will take place while the same cycle that includes the original write operation is still open and tracking new write operations. For example, in cases where there is an in-cycle rewrite, the original write operation corresponding to the rewrite does not typically need to be saved for later replication. For example, in such an embodiment, the cycle need only hold the latest write operation to a specific logical address of the database.

The data structures 500 corresponding to each cycle consume very little overhead, e.g., 8 Bytes per 4 KB of cycle write operations, and can be stored in non-volatile memory, e.g., NVDIMM or even in volatile memory if consistency can be sacrificed in some cases. In some embodiments, the data structures 500 may alternatively be stored on the storage devices 190 themselves although such embodiments may add some performance impact to the replication since the write operations need to be hardened before they are acknowledged.

While a cycle is pending replication, the data structures 400 will comprise indications in LSA metadata entry 402 for any corresponding write operations such that, if they are later invalidated, they will not be reclaimed by the LSA defragmentation control module 188 until the cycle has been closed and replicated to the replication data storage system 135. By leveraging the LSA format to reduce the storage capacity needed for the replication of write operations and instead managing the replication cycles in metadata in the manner described herein, lower overhead and bandwidth usage may be achieved.

With reference to FIGS. 3-5, an example scenario according to the above functionality will now be described. In the example scenario, a database application running on a compute node 110-1 issues a write operation to the data storage system 130 for new data being added to a database data structure. The write operation comprises data that the database application has instructed the data storage system 130 to store in logical data devices for servicing the database data structure and to duplicate into replication logical log devices for maintaining a replication log. In this scenario, the storage control system 150 of storage node 140-1 receives the write operation and performs any necessary data compression on the data using the data compression system 170, e.g., using one or more of data compression module 172 and compressibility determination module 174 as described above.

Unlike in a typical LSA layout, however, in this scenario, the LSA data placement management module 186 writes the data for the logical data devices to the next available location in a log segment 302, e.g., log segment 302-1, but does not write the data to a replication logical log device. For example, the data for the logical data devices associated with the write operation may be written into entry E0. Data structure 400 may then be updated by LSA metadata generation module 182 to indicate that entry E0 comprises data that needs to be replicated to the replication data storage system 135. For example, a bit in a bitmap of LSA metadata entry 402-1 may be updated to indicate that entry E0 of log segment 302-1 comprises data that needs to be replicated. An indicator 502, e.g., indicator $502\text{-}1_1$ in data structure 500-1, is then updated by replication control module 189 to indicate that the data stored at entry E0 is part of cycle 1, e.g., by adding a pointer to entry E0 to the indicator $502\text{-}1_1$.

As additional write operations are received by the data storage system 130, the LSA data placement management module 186 will continue writing data to the entries of log segment 302-1 for the corresponding logical data devices, e.g., entries E2, E3, E4, and E5, until the log segment 302-1 is full. The LSA metadata generation module 182 will update the corresponding LSA metadata entry 402-1 to indicate that these entries comprise data that needs to be replicated to the replication data storage system 135, e.g., by setting the bits corresponding to these entries in the bitmap. The replication control module 189 will also continue updating the indicators 502-1 of data structure 500-1, e.g., indicators $502\text{-}1_2$, $502\text{-}1_3$, etc., to indicate that entries E2, E3, E4 and E5 all comprise data that is part of cycle 1, e.g., by adding pointers to entries E2 through E5 to the corresponding indicators 502-1.

Once the log segment 302-1 is full, LSA data placement management module 186 will identify and utilize the next log segment 302 that has sufficient space to store new data entries, e.g., log segment 302-2. As shown in FIG. 3, for example, the next write operation is actually a rewrite of the logical data device associated with entry E4 of log segment 302-1. LSA data placement management module 186 writes the rewrite data for the logical data device to entry E4' in a similar manner to adding entries E1-E5 as described above. In this case, the LSA metadata generation module 182 will update the corresponding LSA metadata entry 402-2 to indicate that the entry E4' comprises data that needs to be replicated to the replication data storage system 135, e.g., by setting the bit corresponding to entry E4' in the bitmap. The replication control module 189 will also update the next indicator 502-1 of data structure 500-1 to indicate that entry E4' comprises data that is part of cycle 1, e.g., by adding a pointer to entry E4' to the next indicator 502-1.

When the next write operation is a rewrite, for example as with the rewrite of the logical data device associated with entry E4 described above, LSA metadata generation module 182 will invalidate entry E4 in log segment 302-1 but does not yet clear the indication in the corresponding LSA metadata entry 402-1 that indicates that the entry E4 comprises data that needs to be replicated to the replication data storage system 135. This is because, while the data stored in entry E4 is no longer valid from the perspective of the database data structure and the corresponding logical data device is now mapped to entry E4', the data stored in entry E4 may still need to be replicated to the replication data storage system 135 by the replication control module 189.

In some scenarios, where the rewrite is an in-cycle rewrite, e.g., cycle 1 which comprises a pointer to entry E4 is not yet closed, the indicator 502-1 corresponding to entry E4 may be cleared by replication control module 189 since there is no need to replicate the original data from entry E4 if the cycle has not yet closed and the corresponding indicator 502-1 to the rewrite, e.g., a pointer to entry E4', is included in that cycle. In such a scenario, LSA metadata generation module 182 may also update the LSA metadata entry 402-1 to clear the indication that the data stored in entry E4 needs to be saved for replication purposes, thereby allowing entry E4 to be reclaimed by the LSA defragmentation control module 188 for use in storing data corresponding to new write operations.

In other scenarios, where the rewrite occurs in a later cycle, e.g., cycle 1 is closed based on the above described threshold criteria but not yet replicated to the replication data storage system 135 and new write operations are being grouped into another cycle such as, e.g., cycle P, the indicator 502-1 corresponding to entry E4 is not cleared by replication control module 189 since the data for write operations corresponding to cycle 1 still need to be replicated to the replication data storage system 135. In such a scenario, LSA metadata generation module 182 will not update the LSA metadata entry 402-1 to clear the indication that the data stored in entry E4 needs to be saved for replication purposes and instead will leave the indication as is to inhibit the LSA defragmentation control module 188 from reclaiming the data stored in entry E4.

Once a cycle has been replicated to the replication data storage system 135, replication control module 189 clears the indicators 502 in the data structure 500 that corresponds to that cycle and LSA metadata generation module 182 updates the corresponding LSA metadata entries 402 to clear the indications that the corresponding data stored in the entries of the corresponding log segment need to be saved for replication purposes, thereby allowing the entries to be reclaimed by the LSA defragmentation control module 188 for use in storing data corresponding to new write operations once invalidated. The LSA defragmentation control module 188 may then reclaim any invalidated data entries as part of the normal defragmentation process.

With continued reference to FIG. 3, as additional write operations are received by the data storage system 130, the LSA data placement management module 186 will continue writing data to the entries of log segment 302-2 for the corresponding logical data devices, e.g., entries E6 and E7, and the LSA metadata generation module 182 will update the corresponding LSA metadata entry 402-2 to indicate that these entries comprise data that needs to be replicated to the replication data storage system 135, e.g., by setting the bits corresponding to these entries in the bitmap. The replication control module 189 will also continue updating the indicators 502 of the data structure 500 corresponding to the currently open cycle to indicate that entries E6 and E7 all comprise data that is part of this open cycle, e.g., by adding pointers to entries E6 and E7 to the corresponding indicators 502 of the data structure 500 corresponding to the open cycle.

In this manner, entries E1 through E3, E4', and E5 through E7 will be included in the logical data devices, and entries E1 through E7 and E4' will be associated with the replication cycles using metadata without requiring duplication of the data contained in the entries E1 through E7 and E4' into replication logical log device. Since the LSA metadata entries 402-1 and 402-2 comprise indications that the date stored in entries E1 through E7 and E4' are needed for replication to the replication data storage system 135, none of these entries will be reclaimed by the LSA defragmentation control module 188 until the corresponding cycle has been replicated, as described above, unless the corresponding entry was rewritten during the same replication cycle.

For example, during a defragmentation process, LSA defragmentation control module 188 may determine that log segments 302-1 comprises an invalid entry E4. LSA defragmentation control module 188 then checks the corresponding LSA metadata entry 402-1 in the data structure 400 and determines that the indication corresponding to entry E4 has been set which indicates that the data found in entry E4 still needs to be replicated to the replication data storage system 135. The LSA defragmentation control module 188 will then defer reclaiming entry E4 until a later time, e.g., after the data has been replicated and the indication in LSA metadata entry 402-1 has been cleared.

In the above manner, the data storage system 130 may reduce the overhead associated with managing the storage of data that needs to be replicated to the replication data storage system 135 since duplicate writes to the LSAs 192 are no longer required to maintain replication capabilities. In addition, the amount of data that may be stored on the storage devices 190 for use by the logical data devices of the database data structure is improved since duplicates of the data do not need to be separately stored in the LSAs 192 for the purposed of replication. Write overhead is also reduced since duplicate data no longer needs to be sent to the data storage system 130 or transferred internally within the data storage system 130 to the LSAs 192 of the storage devices 190 for replication purposes.

In some embodiments, the above-described replication functionality may be provided to an end user as part of a database solution where the database application may comprise functionality for interfacing and utilizing the above-described replication functionality of the data storage system 130. In other embodiments, the above-described replication functionality may be provided to existing database applications on compute nodes without changing the database applications that are running on the compute nodes. In some embodiments, the end user may be provided with a predefined interface for utilizing the above-described replication functionality associated with managing the storage of data associated with replication logical log device without requiring any other changes to the database application functionality itself. In some embodiments, the end user of the compute node may be aware that the data storage system comprises replication functionality without having any specific knowledge of the manner in which the data storage system implements the above-described replication functionality.

Figure 6:
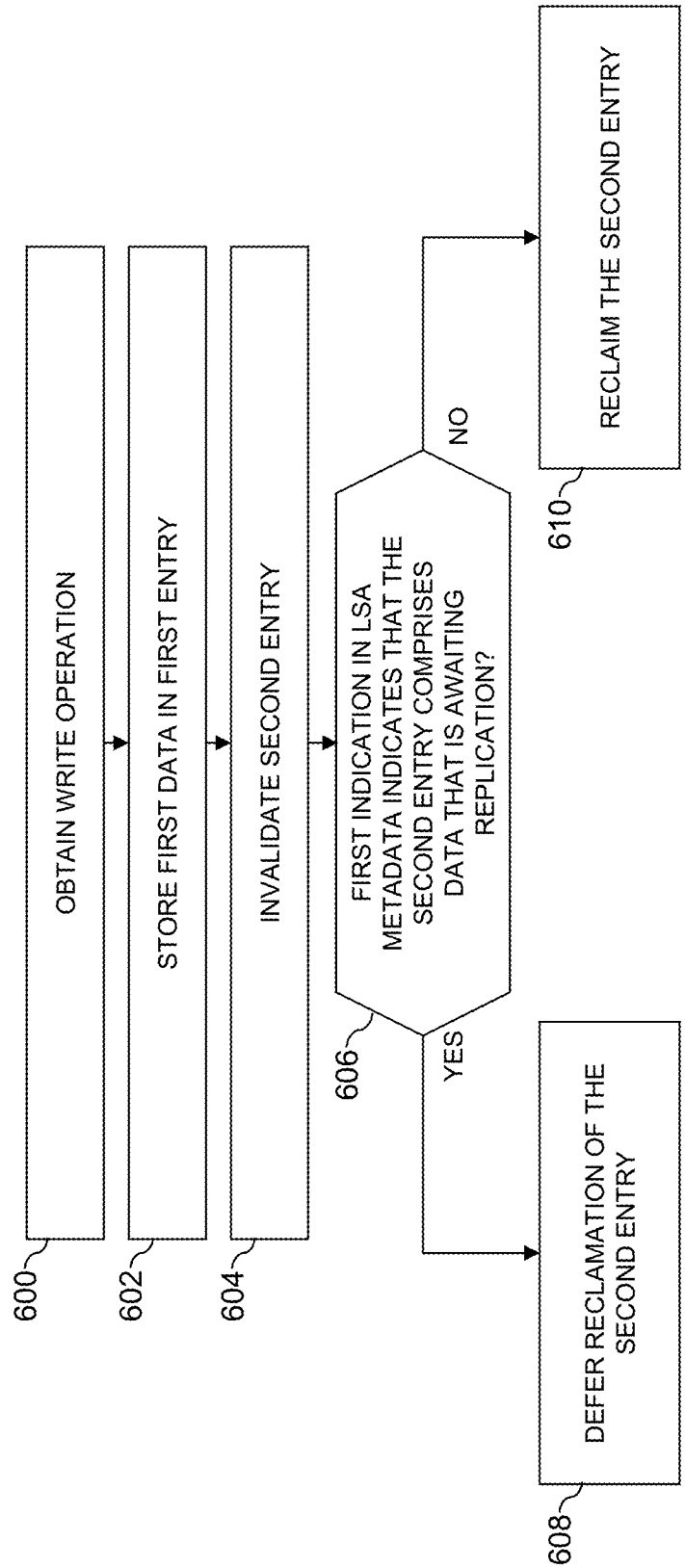
FIG. 6 is a flow diagram of a method of according to an exemplary embodiment of the disclosure.

FIG. 6 is a flow diagram of a process for tracking the replication of write operations using LSA entries that correspond to logical data devices according to an exemplary embodiment of the disclosure. The process as shown in FIG. 6 includes steps 600 through 610. For purposes of illustration, the process flow of FIG. 6 will be discussed in the context of the storage control system 150 of FIG. 1B.

At step 600, the storage control system 150 obtains a write operation issued by a database application running on a compute node 110. The write operation may comprise first data associated with a logical data device of the database application running on the compute node 110.

At step 602, the storage control system 150 stores the first data in a first entry of an LSA 192 implemented on at least one storage device 190 of the data storage system 130.

At step 604, the storage control system 150 invalidates a second entry of the LSA 192 based at least in part on the storage of the first data in the first entry. In this case the second entry already comprises second data that was associated with the logical data device prior to obtaining the write operation, e.g., due to a prior write operation.

At step 606, the storage control system 150 determines, as part of a defragmentation process of the data storage system 130, e.g., using LSA defragmentation control module 188, whether or not a first indication in a LSA metadata entry 402 indicates that the invalidated second entry comprises data that is awaiting replication to the replication data storage system 135. If the first indication indicates that the second entry comprises data that is awaiting replication, the process proceeds to step 608 and the LSA defragmentation control module 188 defers reclamation of the second entry. If the first indication does not indicate that the second entry comprises data that is awaiting replication to the replication data storage system 135, the process proceeds to step 610 and the LSA defragmentation control module 188 reclaims the second entry as part of the defragmentation process.

The particular processing operations and other system functionality described above in conjunction with the flow diagram of FIG. 6 are presented by way of illustrative examples only, and should not be construed as limiting the scope of the disclosure in any way. Alternative embodiments can use other types of processing operations for implementing functionality for tracking data that needs to be replicated using LSA entries that correspond to logical data devices. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to handle multiple page ranges and associated metadata within a given storage system.

Functionality such as that described in conjunction with the flow diagram of FIG. 6 can be implemented at least in part in the form of one or more software programs stored in memory and executed by a processor of a processing device such as a computer or server.

Figure 7:
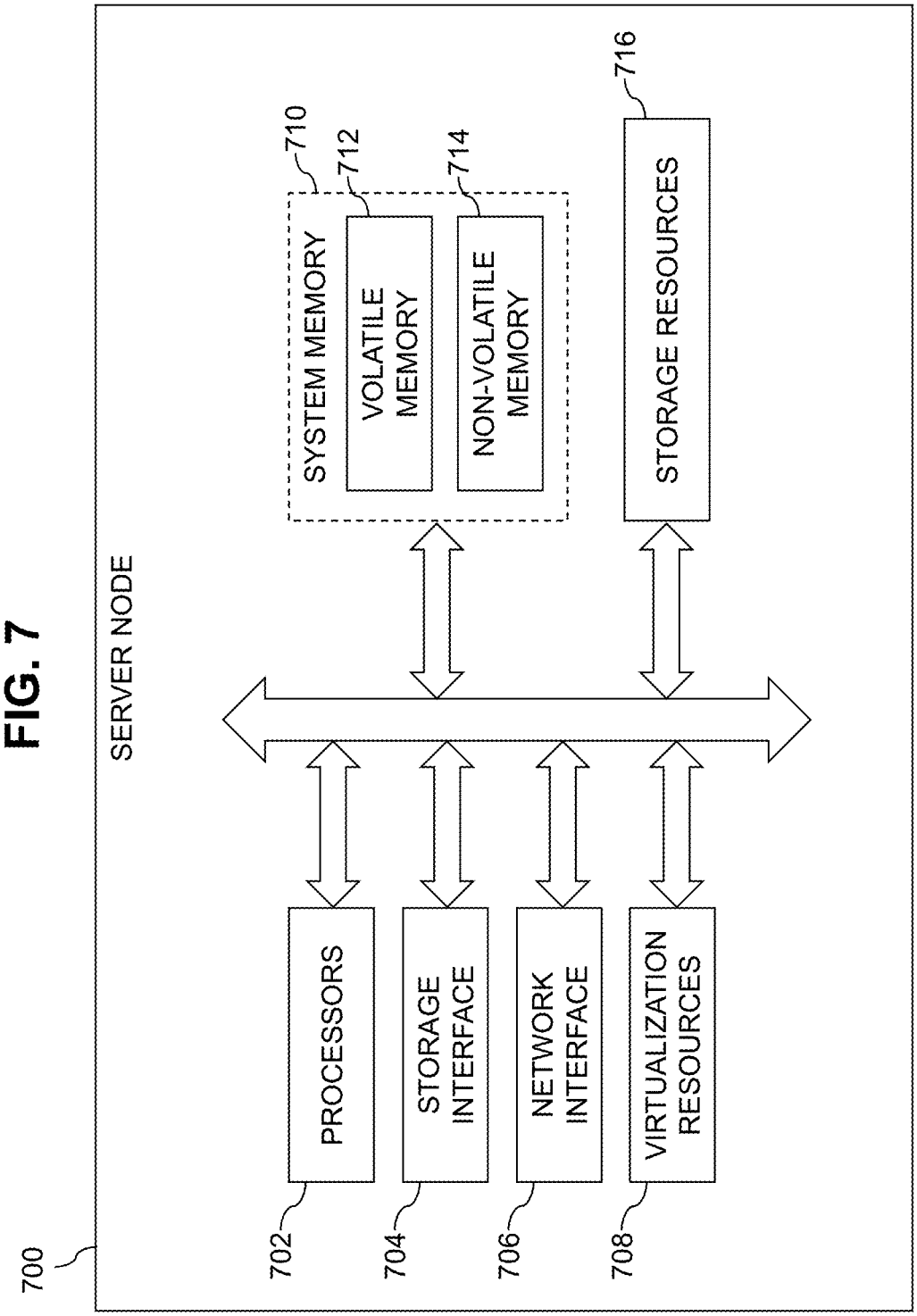
FIG. 7 schematically illustrates a framework of a server node for implementing a storage node which hosts a log-structured storage control system according to an exemplary embodiment of the disclosure.

FIG. 7 schematically illustrates a framework of a server node (e.g., the storage node(s) 140, FIGS. 1A and 1B) which can be implemented for hosting a storage control system (e.g., the storage control system 150, FIG. 1B), according to an exemplary embodiment of the disclosure. The server node 700 comprises processors 702, storage interface circuitry 704, network interface circuitry 706, virtualization resources 708, system memory 710, and storage resources 716. The system memory 710 comprises volatile memory 712 and non-volatile memory 714.

The processors 702 comprise one or more types of hardware processors that are configured to process program instructions and data to execute a native operating system (OS) and applications that run on the server node 700. For example, the processors 702 may comprise one or more CPUs, microprocessors, microcontrollers, application specific integrated circuits (ASICs), field programmable gate arrays (FPGAs), and other types of processors, as well as portions or combinations of such processors. The term "processor" as used herein is intended to be broadly construed so as to include any type of processor that performs processing functions based on software, hardware, firmware, etc. For example, a "processor" is broadly construed so as to encompass all types of hardware processors including, for example, (i) general purpose processors which comprise "performance cores" (e.g., low latency cores), and (ii) workload-optimized processors, which comprise any possible combination of multiple "throughput cores" and/or multiple hardware-based accelerators. Examples of workload-optimized processors include, for example, graphics processing units (GPUs), digital signal processors (DSPs), system-on-chip (SoC), tensor processing units (TPUs), image processing units (IPUs), deep learning accelerators (DLAs), artificial intelligence (AI) accelerators, and other types of specialized processors or coprocessors that are configured to execute one or more fixed functions.

The storage interface circuitry 704 enables the processors 702 to interface and communicate with the system memory 710, the storage resources 716, and other local storage and off-infrastructure storage media, using one or more standard communication and/or storage control protocols to read data from or write data to volatile and non-volatile memory/ storage devices. Such protocols include, but are not limited to, non-volatile memory express (NVMe), peripheral component interconnect express (PCIe), Parallel ATA (PATA), Serial ATA (SATA), Serial Attached SCSI (SAS), Fibre Channel, etc. The network interface circuitry 706 enables the server node 700 to interface and communicate with a network and other system components. The network interface circuitry 706 comprises network controllers such as network cards and resources (e.g., network interface controllers (NICs) (e.g., SmartNICs, RDMA-enabled NICs), Host Bus Adapter (HBA) cards, Host Channel Adapter (HCA) cards, I/O adaptors, converged Ethernet adaptors, etc.) to support communication protocols and interfaces including, but not limited to, PCIe, DMA and RDMA data transfer protocols, etc.

The virtualization resources 708 can be instantiated to execute one or more services or functions which are hosted by the server node 700. For example, the virtualization resources 708 can be configured to implement the various modules and functionalities of the storage control system 150 as shown in FIG. 1B as discussed herein. In one embodiment, the virtualization resources 708 comprise virtual machines that are implemented using a hypervisor platform which executes on the server node 700, wherein one or more virtual machines can be instantiated to execute functions of the server node 700. As is known in the art, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine. Thus, different virtual machines can run different operating systems and multiple applications on the same physical computer.

A hypervisor is an example of what is more generally referred to as "virtualization infrastructure." The hypervisor runs on physical infrastructure, e.g., CPUs and/or storage devices, of the server node 700, and emulates the CPUs, memory, hard disk, network and other hardware resources of the host system, enabling multiple virtual machines to share the resources. The hypervisor can emulate multiple virtual hardware platforms that are isolated from each other, allowing virtual machines to run, e.g., Linux and Windows Server operating systems on the same underlying physical host. The underlying physical infrastructure may comprise one or more commercially available distributed processing platforms which are suitable for the target application.

In another embodiment, the virtualization resources 708 comprise containers such as Docker containers or other types of Linux containers (LXCs). As is known in the art, in a container-based application framework, each application container comprises a separate application and associated dependencies and other components to provide a complete filesystem, but shares the kernel functions of a host operating system with the other application containers. Each application container executes as an isolated process in user space of a host operating system. In particular, a container system utilizes an underlying operating system that provides the basic services to all containerized applications using virtual-memory support for isolation. One or more containers can be instantiated to execute one or more applications or functions of the server node 700 as well as execute one or more of the various modules and functionalities of the storage control system 150 of FIG. 1B as discussed herein. In yet another embodiment, containers may be used in combination with other virtualization infrastructure such as virtual machines implemented using a hypervisor, wherein Docker containers or other types of LXCs are configured to run on virtual machines in a multi-tenant environment.

In some embodiments, the various components, systems, and modules of the storage control system 150 comprise program code that is loaded into the system memory 710 (e.g., volatile memory 712), and executed by the processors 702 to perform respective functions as described herein. In this regard, the system memory 710, the storage resources 716, and other memory or storage resources as described herein, which have program code and data tangibly embodied thereon, are examples of what is more generally referred to herein as "processor-readable storage media" that store executable program code of one or more software programs. Articles of manufacture comprising such processor-readable storage media are considered embodiments of the disclosure. An article of manufacture may comprise, for example, a storage device such as a storage disk, a storage array or an integrated circuit containing memory. The term "article of manufacture" as used herein should be understood to exclude transitory, propagating signals.

The system memory 710 comprises various types of memory such as volatile RAM, NVRAM, or other types of memory, in any combination. The volatile memory 712 may be a dynamic random-access memory (DRAM) (e.g., DRAM DIMM (Dual In-line Memory Module), or other forms of volatile RAM. The non-volatile memory 714 may comprise one or more of NAND Flash storage devices, SSD devices, or other types of next generation non-volatile memory (NGNVM) devices. The system memory 710 can be implemented using a hierarchical memory tier structure wherein the volatile memory 712 is configured as the highest-level memory tier, and the non-volatile memory 714 (and other additional non-volatile memory devices which comprise storage-class memory) is configured as a lower level memory tier which is utilized as a high-speed load/store non-volatile memory device on a processor memory bus (i.e., data is accessed with loads and stores, instead of with I/O reads and writes). The term "memory" or "system memory" as used herein refers to volatile and/or non-volatile memory which is utilized to store application program instructions that are read and processed by the processors 702 to execute a native operating system and one or more applications or processes hosted by the server node 700, and to temporarily store data that is utilized and/or generated by the native OS and application programs and processes running on the server node 700. The storage resources 716 can include one or more HDDs, SSD storage devices, etc.

It is to be understood that the above-described embodiments of the disclosure are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of such embodiments. Numerous other alternative embodiments within the scope of the appended claims will be readily apparent to those skilled in the art.

What is claimed is:

1. A method, comprising:
   obtaining a write operation issued by an application, the write operation comprising first data associated with a logical data device of the application;
   storing the first data in a first entry of a log-structured array implemented on at least one storage device of a storage system;
   invalidating a second entry of the log-structured array based at least in part on the storage of the first data in the first entry, the second entry comprising second data associated with the logical data device that was stored in the second entry prior to obtaining the write operation;
   determining that a first indication in log-structured array metadata associated with the log-structured array indicates that the invalidated second entry comprises data that is awaiting replication to a replication storage system; and
   deferring reclamation of the second entry based at least in part on the determination that the first indication in the log-structured array metadata indicates that the invalidated second entry comprises data that is awaiting replication to the replication storage system;
   wherein the first indication in the log-structured array metadata indicating that the invalidated second entry comprises data that is awaiting replication to the replication storage system further indicates that the invalidated second entry is being utilized to provide at least a portion of a replication log that includes the data awaiting replication to the replication storage system; and wherein the method is performed by at least one processing device of the storage system, the at least one processing device comprising at least one processor coupled to memory.

2. The method of claim 1, wherein the method further comprises:
replicating the second data to the replication storage system;
clearing the first indication in the log-structured array metadata based at least in part on the replication of the second data;
determining that the first indication in the log-structured array metadata indicates that the invalidated second entry does not comprise data that is awaiting replication to the replication storage system; and
reclaiming the second entry based at least in part on the determination that the first indication indicates that the invalidated second entry does not comprise data that is awaiting replication to the replication storage system.

3. The method of claim 2, wherein replicating the second data to the replication storage system comprises:
determining that a second indication in replication metadata indicates that the second data corresponds to a group of write operations awaiting replication to the replication storage system;
determining that a threshold criterion for replicating the group of write operations has been met; and
replicating data corresponding to the group of write operations to the replication storage system based at least in part on the replication metadata and the threshold criterion being met, the data corresponding to the group of write operations comprising the second data.

4. The method of claim 3, wherein the threshold criterion comprises at least one of a predetermined number of write operations added to the group, a predetermined size of data corresponding to the write operations added to the group and a predetermined amount of time since the group was created.

5. The method of claim 3, wherein the method further comprises setting a third indication in the replication metadata based at least in part on the storing of the first data in the first entry, the third indication indicating that the write operation corresponding to the first data is awaiting replication to the replication storage system.

6. The method of claim 5 wherein:
the third indication indicates that the write operation corresponding to the first data is included in the group of write operations awaiting replication to the replication storage system; and
replicating the data corresponding to the group of write operations to the replication storage system based at least in part on the replication metadata and the threshold criterion comprises replicating the first data to the replication storage system based at least in part on the third indication.

7. The method of claim 1, wherein the method further comprises:
determining that a second indication in replication metadata indicates that the second data corresponds to a group of write operations awaiting replication to the replication storage system;
setting a third indication in the replication metadata based at least in part on the storing of the first data in the first entry, the third indication indicating that the write operation corresponding to the first data is included in the group of write operations awaiting replication to the replication storage system;
determining that the second data and the first data both correspond to the same group of write operations awaiting replication to the replication storage system based at least in part on the second indication and the third indication;
clearing the first indication in the log-structured array metadata based at least in part on the determination that the second data and the first data both correspond to the same group of write operations awaiting replication to the replication storage system;
determining that the first indication in the log-structured array metadata indicates that the invalidated second entry does not comprise data that is awaiting replication to the replication storage system; and
reclaiming the second entry based at least in part on the determination that the first indication indicates that the invalidated second entry does not comprise data that is awaiting replication to the replication storage system.

8. An article of manufacture comprising a non-transitory processor-readable storage medium having stored therein program code of one or more software programs, wherein the program code is executable by one or more processors to implement a method comprising:
obtaining a write operation issued by an application, the write operation comprising first data associated with a logical data device of the application;
storing the first data in a first entry of a log-structured array implemented on at least one storage device of a storage system;
invalidating a second entry of the log-structured array based at least in part on the storage of the first data in the first entry, the second entry comprising second data associated with the logical data device that was stored in the second entry prior to obtaining the write operation;
determining that a first indication in log-structured array metadata associated with the log-structured array indicates that the invalidated second entry comprises data that is awaiting replication to a replication storage system; and
deferring reclamation of the second entry based at least in part on the determination that the first indication in the log-structured array metadata indicates that the invalidated second entry comprises data that is awaiting replication to the replication storage system;
wherein the first indication in the log-structured array metadata indicating that the invalidated second entry comprises data that is awaiting replication to the replication storage system further indicates that the invalidated second entry is being utilized to provide at least a portion of a replication log that includes the data awaiting replication to the replication storage system.

9. The article of manufacture of claim 8, wherein the method further comprises:
replicating the second data to the replication storage system;
clearing the first indication in the log-structured array metadata based at least in part on the replication of the second data;
determining that the first indication in the log-structured array metadata indicates that the invalidated second entry does not comprise data that is awaiting replication to the replication storage system; and reclaiming the second entry based at least in part on the determination that the first indication indicates that the invalidated second entry does not comprise data that is awaiting replication to the replication storage system.

10. The article of manufacture of claim 9, wherein replicating the second data to the replication storage system comprises:
determining that a second indication in replication metadata indicates that the second data corresponds to a group of write operations awaiting replication to the replication storage system;
determining that a threshold criterion for replicating the group of write operations has been met; and
replicating data corresponding to the group of write operations to the replication storage system based at least in part on the replication metadata and the threshold criterion being met, the data corresponding to the group of write operations comprising the second data.

11. The article of manufacture of claim 10, wherein the threshold criterion comprises at least one of a predetermined number of write operations added to the group, a predetermined size of data corresponding to the write operations added to the group and a predetermined amount of time since the group was created.

12. The article of manufacture of claim 10, wherein the method further comprises setting a third indication in the replication metadata based at least in part on the storing of the first data in the first entry, the third indication indicating that the write operation corresponding to the first data is awaiting replication to the replication storage system.

13. The article of manufacture of claim 12, wherein:
the third indication indicates that the write operation corresponding to the first data is included in the group of write operations awaiting replication to the replication storage system; and
replicating the data corresponding to the group of write operations to the replication storage system based at least in part on the replication metadata and the threshold criterion comprises replicating the first data to the replication storage system based at least in part on the third indication.

14. The article of manufacture of claim 8, wherein the method further comprises:
determining that a second indication in replication metadata indicates that the second data corresponds to a group of write operations awaiting replication to the replication storage system;
setting a third indication in the replication metadata based at least in part on the storing of the first data in the first entry, the third indication indicating that the write operation corresponding to the first data is included in the group of write operations awaiting replication to the replication storage system;
determining that the second data and the first data both correspond to the same group of write operations awaiting replication to the replication storage system based at least in part on the second indication and the third indication;
clearing the first indication in the log-structured array metadata based at least in part on the determination that the second data and the first data both correspond to the same group of write operations awaiting replication to the replication storage system;
determining that the first indication in the log-structured array metadata indicates that the invalidated second entry does not comprise data that is awaiting replication to the replication storage system; and reclaiming the second entry based at least in part on the determination that the first indication indicates that the invalidated second entry does not comprise data that is awaiting replication to the replication storage system.

15. An apparatus comprising:
a storage system comprising at least one processor coupled to memory, the at least one processor being configured:
to obtain a write operation issued by an application, the write operation comprising first data associated with a logical data device of the application;
to store the first data in a first entry of a log-structured array implemented on at least one storage device of a storage system;
to invalidate a second entry of the log-structured array based at least in part on the storage of the first data in the first entry, the second entry comprising second data associated with the logical data device that was stored in the second entry prior to obtaining the write operation;
to determine that a first indication in log-structured array metadata associated with the log-structured array indicates that the invalidated second entry comprises data that is awaiting replication to a replication storage system; and
to defer reclamation of the second entry based at least in part on the determination that the first indication in the log-structured array metadata indicates that the invalidated second entry comprises data that is awaiting replication to the replication storage system;
wherein the first indication in the log-structured array metadata indicating that the invalidated second entry comprises data that is awaiting replication to the replication storage system further indicates that the invalidated second entry is being utilized to provide at least a portion of a replication log that includes the data awaiting replication to the replication storage system.

16. The apparatus of claim 15, wherein the at least one processor is further configured:
to replicate the second data to the replication storage system;
to clear the first indication in the log-structured array metadata based at least in part on the replication of the second data;
to determine that the first indication in the log-structured array metadata indicates that the invalidated second entry does not comprise data that is awaiting replication to the replication storage system; and
to reclaim the second entry based at least in part on the determination that the first indication indicates that the invalidated second entry does not comprise data that is awaiting replication to the replication storage system.

17. The apparatus of claim 16, wherein replicating the second data to the replication storage system comprises:
determining that a second indication in replication metadata indicates that the second data corresponds to a group of write operations awaiting replication to the replication storage system;
determining that a threshold criterion for replicating the group of write operations has been met; and
replicating data corresponding to the group of write operations to the replication storage system based at least in part on the replication metadata and the threshold criterion being met, the data corresponding to the group of write operations comprising the second data.

18. The apparatus of claim 17, wherein the at least one processor is further configured to set a third indication in the replication metadata based at least in part on the storing of the first data in the first entry, the third indication indicating that the write operation corresponding to the first data is awaiting replication to the replication storage system.

19. The apparatus of claim 18, wherein:
the third indication indicates that the write operation corresponding to the first data is included in the group of write operations awaiting replication to the replication storage system; and
replicating the data corresponding to the group of write operations to the replication storage system based at least in part on the replication metadata and the threshold criterion comprises replicating the first data to the replication storage system based at least in part on the third indication.

20. The apparatus of claim 15, wherein the at least one processor is further configured:
to determine that a second indication in replication metadata indicates that the second data corresponds to a group of write operations awaiting replication to the replication storage system;
to set a third indication in the replication metadata based at least in part on the storing of the first data in the first entry, the third indication indicating that the write operation corresponding to the first data is included in the group of write operations awaiting replication to the replication storage system;
to determine that the second data and the first data both correspond to the same group of write operations awaiting replication to the replication storage system based at least in part on the second indication and the third indication;
to clear the first indication in the log-structured array metadata based at least in part on the determination that the second data and the first data both correspond to the same group of write operations awaiting replication to the replication storage system;
to determine that the first indication in the log-structured array metadata indicates that the invalidated second entry does not comprise data that is awaiting replication to the replication storage system; and
to reclaim the second entry based at least in part on the determination that the first indication indicates that the invalidated second entry does not comprise data that is awaiting replication to the replication storage system.

* * * * *